United States Patent [19]

Hirota et al.

[11] Patent Number: 4,757,391

[45] Date of Patent: Jul. 12, 1988

[54] HELICAL SCAN TYPE MAGNETIC RECORDING AND REPRODUCING APPARATUS RECORDING MULTIPLE SIGNALS ON MULTIPLE AXIALLY DISPLACED TAPE TRACKS

[75] Inventors: Akira Hirota, Chigasaki; Yasutoshi Matsuo, Yokohama, both of Japan

[73] Assignee: Victor Company of Japan, Ltd., Yokohama, Japan

[21] Appl. No.: 833,861

[22] Filed: Feb. 26, 1986

[30] Foreign Application Priority Data

Feb. 28, 1985 [JP] Japan .................. 60-39789
Feb. 28, 1985 [JP] Japan .................. 60-39790
Mar. 1, 1985 [JP] Japan .................. 60-40804

[51] Int. Cl.$^4$ .......................... H04N 5/782
[52] U.S. Cl. ...................... 358/320; 358/310; 360/22; 360/36.1
[58] Field of Search ............ 358/310, 315, 319–321, 358/324, 327, 328, 335, 337–338, 340; 360/22, 36.1, 37.1

[56] References Cited

U.S. PATENT DOCUMENTS

| 4,296,430 | 10/1981 | Warren . | |
|---|---|---|---|
| 4,485,395 | 11/1984 | Warren | 360/36.1 X |
| 4,532,555 | 7/1985 | Sagara et al. | 358/310 |
| 4,608,611 | 8/1986 | Ota | 358/328 |
| 4,613,827 | 9/1986 | Takamori et al. | 360/36.1 X |
| 4,618,894 | 10/1986 | Ichinoi | 358/328 X |

FOREIGN PATENT DOCUMENTS

| 3220464 | 12/1983 | Fed. Rep. of Germany . |
|---|---|---|
| 3307324 | 9/1984 | Fed. Rep. of Germany . |
| 2431746 | 2/1980 | France . |
| 58-170012 | 11/1983 | Japan . |
| 2027252 | 2/1980 | United Kingdom . |

OTHER PUBLICATIONS

"Sony Basic Video Recording Course-Tape Formats", Sony Video Products Company, 1979, pp. 8–9.

Primary Examiner—Raymond F. Cardillo
Assistant Examiner—W. R. Young
Attorney, Agent, or Firm—Ladas & Parry

[57] ABSTRACT

A helical scan type magnetic recording and reproducing apparatus comprises a rotary body which is wrapped with a magnetic tape on an outer peripheral surface thereof over a predetermined angular range and has a tape guide for guiding a part of the magnetic tape, and n pairs of rotary heads mounted on the rotary body. Each pair out of the n pairs of rotary heads is constituted by two rotary heads which are mounted at mutually opposite positions on a rotational plane of the rotary body at the same height position, and each pair out of the n pairs of rotary heads is mounted at different positions in an axial direction of the rotary body. The n pairs of rotary heads simultaneously record a luminance signal and two kinds of signals constituting a color video signal on n groups of tracks which are mutually separated in the tape width direction, so that the luminance signal is recorded on one group of tracks which is closest to the tape guide of the rotary body in order to minimize a jitter in the luminance signal which is reproduced.

7 Claims, 12 Drawing Sheets

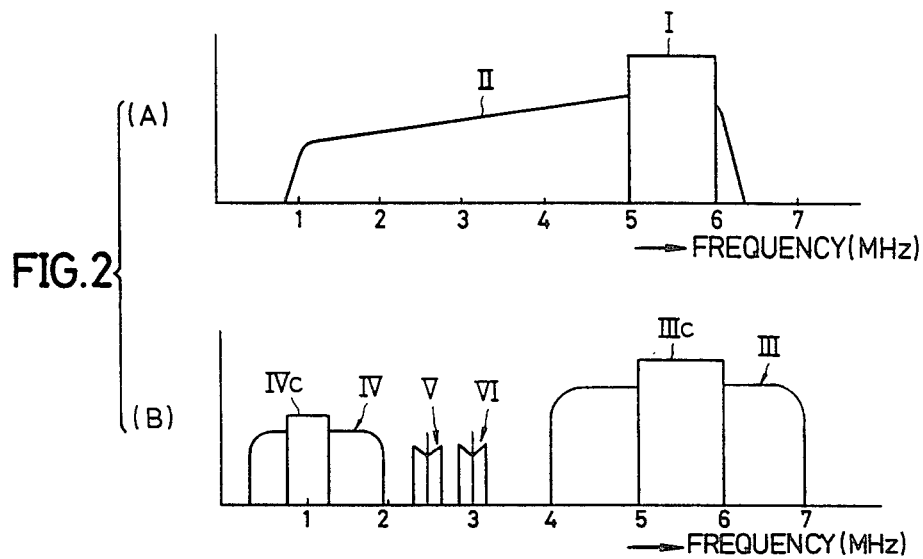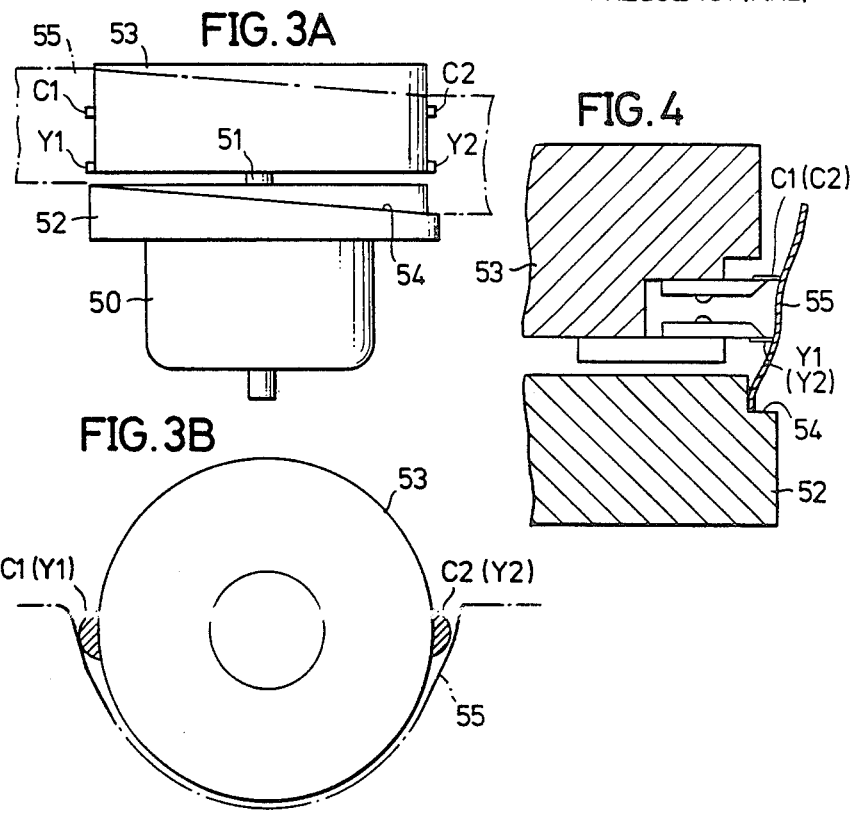

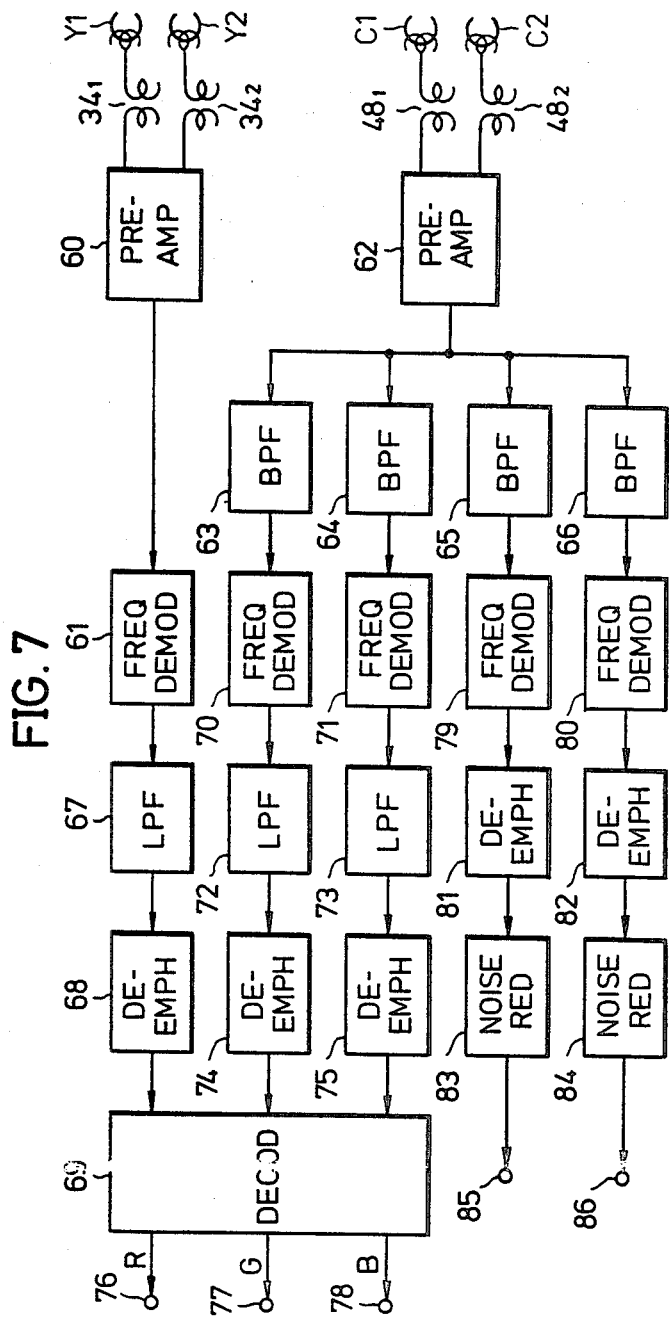

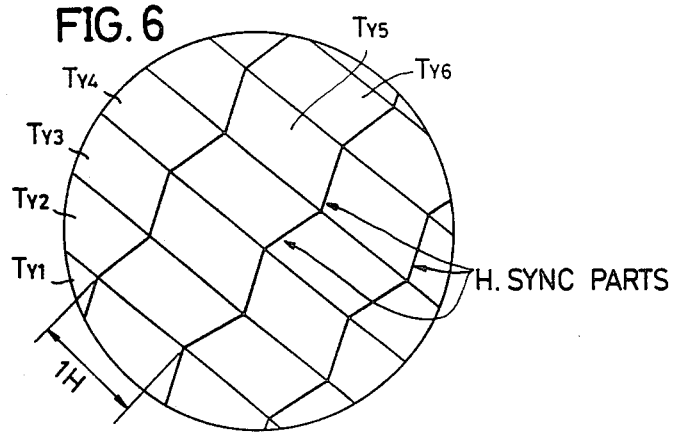
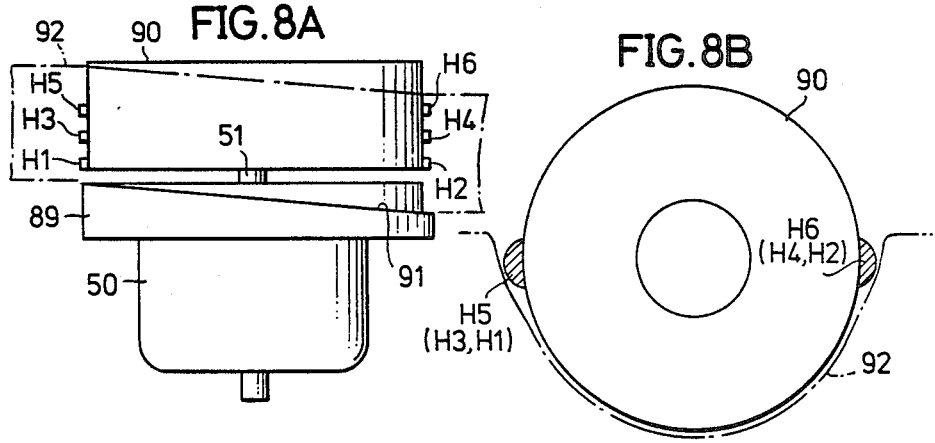
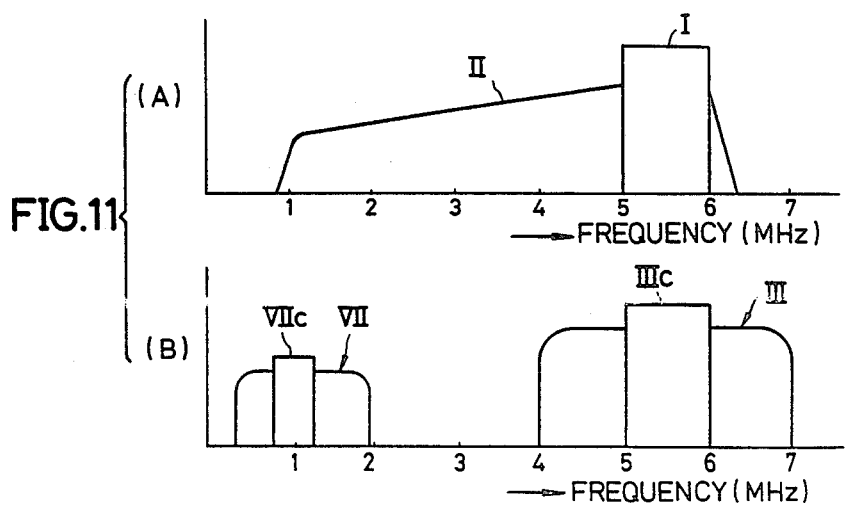

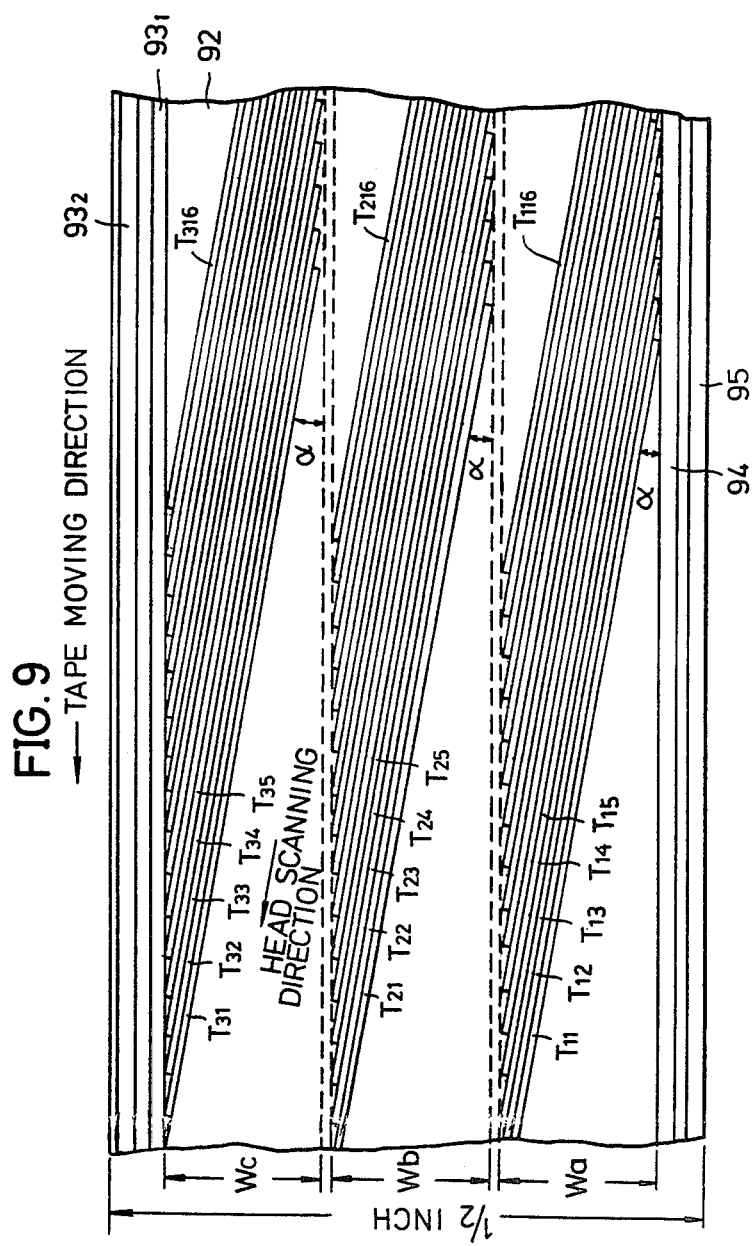

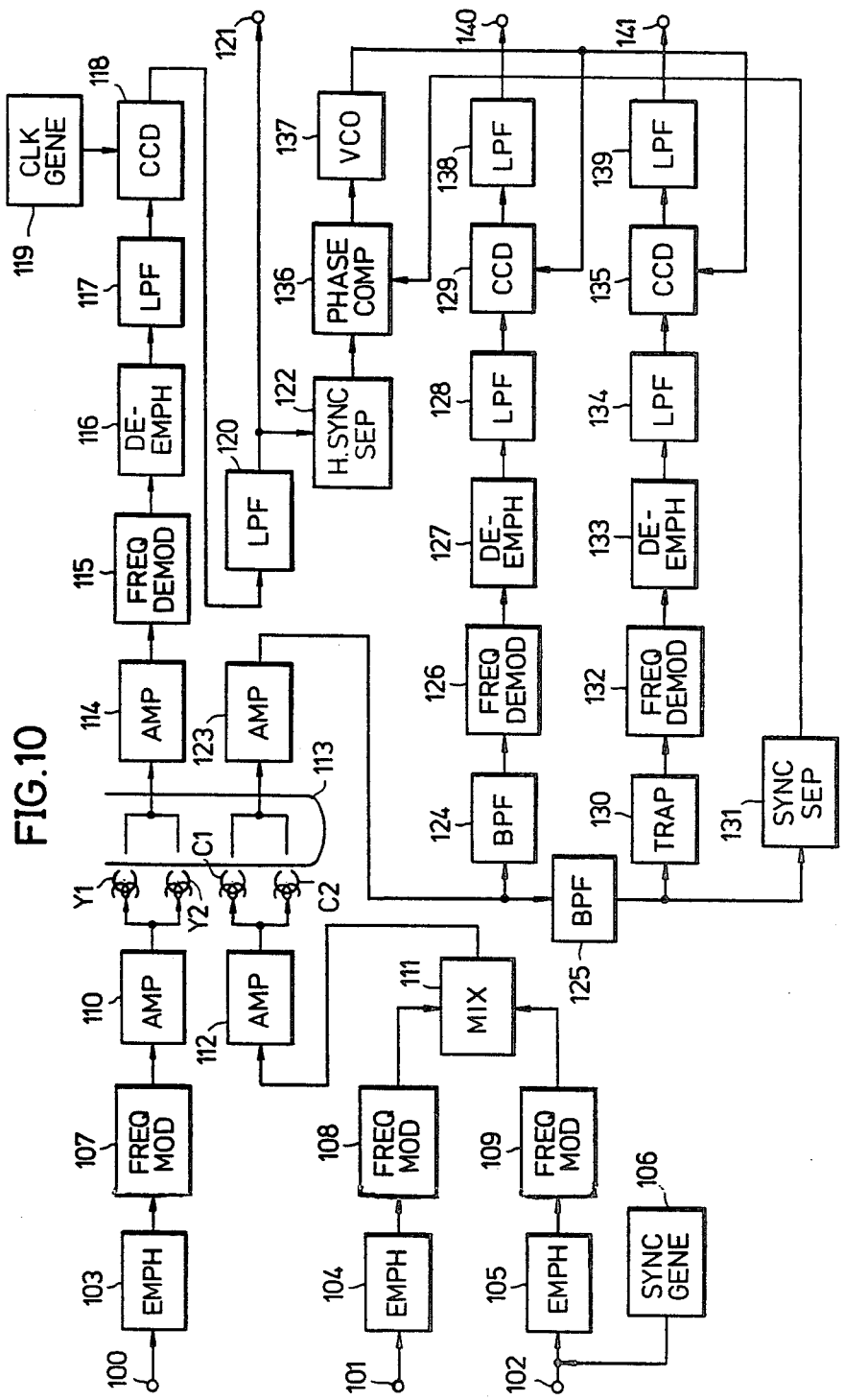

HELICAL SCAN TYPE MAGNETIC RECORDING AND REPRODUCING APPARATUS RECORDING MULTIPLE SIGNALS ON MULTIPLE AXIALLY DISPLACED TAPE TRACKS

BACKGROUND OF THE INVENTION

The present invention generally relates to helical scan type magnetic recording and reproducing apparatuses for forming tracks which are mutually separated in a width direction of a tape and, more particularly, to a magnetic recording and reproducing apparatus which records three kinds of signals constituting a color video signal on a plurality of tracks which are mutually separated in the tape width direction by use of a plurality of rotary heads which simultaneously and independently form the plurality of tracks for, at the time of reproduction, a picture a satisfactory quality and having only an extremely small time base deviation.

A helical scan type magnetic recording and reproducing apparatus (VTR) which uses a magntetic tape having a width of ½ inch is presently used in various fields. However, in the VTR for home use, the frequency band in which the recording and reproduction can be performed is relatively narrow. For this reason, in the VTR for home use, a luminance signal separated from a color video signal is frequency modulated, a carrier chrominance signal separated from the color video signal is frequency-converted into a low frequency range, and the frequency modulated luminance signal and the frequency converted carrier chrominance signal are frequency-division-multiplexed for recording on and reproduction from the tape. In the present specification, such a recording and reproducing system in which the carrier chrominance signal is frequency-converted into the low frequency range will be referred to as a low-band conversion system. Further, in the VTR for home use, the tape utilization efficiency is improved by employing a system which does not form guard bands at the time of the recording and uses rotary heads having gaps of mutually different azimuth angles to record two mutually adjacent tracks.

On the other hand, in the VTR for business use such as broadcasting and especially in the case of a one-body type VTR having a camera unitarily built therein, there are damands to downsize the apparatus, reduce the weight of the apparatus and obtain a reproduced color video signal having a high picture quality. Hence, the luminance signal and color difference signals are recorded on independent tracks on the tape which has a width identical to that used in the VTR for home use by rotary heads so that a guard band is formed between two mutually adjacent tracks. In the present specification, such a recording and reproducing system will be referred to as a Y/C separation system.

In a VTR employing the Y/C separation system, during a time period in which one rotary head records one field of the luminance signal on one track, another rotary head records one field of the color difference signals on another track. Thus, two tracks are simultaneously formed in each time period of one field. The track recorded with the liminance signal and the track recorded with the color difference signals are formed adjacent to each other along a longitudinal direction of the tape.

The luminance signal and the color difference signals are recorded on and reproduced from independent tracks on the tape according to the Y/C separation system. For this reason, although a moire occurs with a VTR employing the low-band conversion system when the frequency modulated luminance signal and the frequency converted carrier chrominance signal are simultaneously recorded on the same track on the tape which is a non-linear transmission system, such a moire will not occur with a VTR employing the Y/C separation system. In addition, it is possible to reserve sufficiently wide frequency bands for recording and reproducing the luminance signal and the color difference signals. Further, because the VTR employing the Y/C separation system does not record the frequency converted carrier chrominance signal by using the frequency modulated luminance signal as a bias signal, it is possible to improve the signal-to-noise (S/N) ratio of the reproduced color difference signals. As a result, it is possible to obtain a reproduced color video signal having a high picture quality compared to the VTR employing the low-band conversion system.

However, the tape utilization efficiency is poor with to the Y/C separation system because of the need to provide the guard band. Moreover, if the rotary head crosses a guard band during reproduction and scans a track which is adjacent to the track which was to be scanned, the rotary head, which should have produced the luminance signal (or the color difference signal) will reproduce the color difference signals (or the luminance signal) since two mutually adjacent tracks are independently recorded with the luminance signal and the color difference signals. There is no field correlation between the reproduced signals from the two mutually adjacent tracks, and thus, it is also impossible to eliminate crosstalk by a crosstalk cancelling method which uses the field correlation as is done in the VTR for home use which employs the low-band conversion system. Hence, the VTR employing the Y/C separation system has a problem in that the crosstalk is conspicuous in the reproduced picture.

The conventional VTR employing the Y/C separation system simultaneously records and reproduces the luminance signal and the color difference signals on and from independent tracks on the tape by a pair of rotary heads having gaps of mutually different azimuth angles. For this reason, when a tracking error occurs during reproduction, there is a problem in that a time difference occurs between the luminance signal and color reproduced signals by the pair of rotary heads.

Accordingly, in order to eliminate the problems described above, recording the reproducing apparatuses were previously proposed in a Japanese Utility Model Application No. 57-66496 (Japanese Laid-Open Utility Model Application No. 58-170012), Japanese Patent Application Nos. 60-35827 and 60-35828 in which the applicant is the same as the assignee of the preset application. According to the previously proposed apparatuses, three kinds of signals constituting the color video signal are recorded on and reproduced from a plurality of tracks formed in recording regions of the tape which are separated from each other in the tape width direction. Since the recording regions in which the plurality of tracks are simultaneously and independently formed on the tape are completely separated from each other, it is possible to prevent mutual interference among the signals reproduced from the tracks in the different recording regions and hence eliminate the problems of the conventional apparatus.

However, in the previously proposed apparatuses, there is a question as to which tracks the three kinds of signals constituting the color video signal, that is, the luminance signal and two kinds of color difference signals, for example, should be recorded on. The signals reproduced from the tracks in the recording regions which are separated from each other in the tape width direction include time base deviations (jitters) which are mutually different. Generally, the tape is moved in a state where the lower part of the tape is stably guided by a tape guide. Accordingly, there is less jitter in the signals reproduced from the tracks in the lower part of the tape compared to the signals reproduced from the tracks in the upper part of the tape.

The tape is wrapped around the outer peripheral surfaces of an upper rotary drum and a lower stationary drum with the lower part of the tape guided by a tape guide formed on the lower stationary drum. For example, a pair of rotary heads which are mounted on the upper rotary drum at positions separated from each other in the axial direction of the upper rotary drum simultaneously form two independent tracks which are mutually separated in the tape width direction. In this case, in a vicinity of an entrance position of the upper rotary drum where the pair of rotary heads start to make sliding contact with the tape, it is known that the thickness of an air film which is formed between the tape and the outer peripehral surface of the upper rotary drum is larger toward the upper part of the tape and is largest at the upper edge of the tape. For this reason, the contact pressure with which the rotary head makes contact with the tape and the S/N ratio of the signal which is recorded and reproduced are poor in the tracks which are located close to the upper edge of the tape.

On the other hand, when the luminance signal and the two kinds of color difference signals are compared, the frequency band of the luminance signal is wider than those of the color difference signals. Further, high frequency components (information related to a small area in the picture) of the color difference signals are not transmitted as much as a high frequency component of the luminance signal. For this reason, even when there is slight jitter in the color difference signals, the effects of such slight jitter in the color difference signals are visually inconspicuous compared to a jitter in the luminance signal. In addition, the luminance signal includes synchronizing signals which are used in a servo system and a monitor, and this also makes desirable for the luminance signal to be free of jitter.

Moreover, in the previously proposed apparatuses, the signals simultaneously reproduced from the independent tracks in the recording regions which are separated from each other in the tape width direction include jitters which are mutually different due to inconsistency in the tension of the tape, the stretch of the tape and the like. As a result, it is extremely difficult to make the time bases of each of the reproduced signals perfectly coincide with each other.

SUMMARY OF THE INVENTION

Accordingly, it is a general object of the present invention to provide a novel and useful helical scan type magnetic recording and reproducing apparatus in which the problems described heretofore are eliminated.

Another and more specific object of the present invention is to provide a helical scan type magnetic recording and reproducing apparatus in which luminance and color difference signals are simultaneously recorded on a plurality of independent tracks which are mutually separated in the tape width direction and the luminance signal is recorded on the one track which is closest to a tape guide of a stationary drum. Accordingly, with the apparatus of the present invention, time base deviation in the luminance signal which is reproduced from the one track is smaller than that of the signals reproduced from the other tracks due to the provision of the tape guide which stably guides the lower part of the moving tape. Moreover, because the thickness of an air film formed between the tape and the outer peripheral surface of the drum is a minimum at the lower part of the tape where the one track is formed, it is thus possible to perform a satisfactory reproduction. The time base deviation in synchronizing signals and the like within the luminance signal which is reproduced from the one track is thereby kept to a minimum, and it is hence possible to stably obtain a reproduced color picture having a high picture quality.

Still another object of the present invention is to provide a helical scan type magnetic recording and reproducing apparatus in which out of signals simultaneously recorded on a plurality of independent tracks which are mutually separated in the tape width direction a signal originally not having horizontal synchronizing signals is added with synchronizing signals before being recorded. At the time of a reproduction, the added synchronizing signals are detected and separated from the reproduced signals, and an error signal is obtained by comparing the phase of the reproduced added synchronizing signals and the phase of the reproduced horizontal synchronizing signals. Mutual time differences among the reproduced signals from the tracks are minimized based on the error signal. According to the apparatus of the present invention, even in the case where the reproduced signals simultaneously obtained from the independent tracks which are separated from each other in the tape width direction include jitters which are mutually different due to an inconsistency in the tension of the tape, a stretch in the tape and the like, it is possible to automatically match the timings (phases) of the reproduced signals. Therefore, it is possible to record and reproduce a color video signal having a high picture quality.

A further object of the present invention is to provide a multiple-function helical scan type magnetic recording and reproducing apparatus in which signals are simultaneously recorded on and reproduced from a plurality of independent tracks which are mutually separated in the tape width direction and the signal to be recorded is obtained by arbitrarily switching a plurality of recording and reproducing circuit systems. According to the apparatus of the present invention, in addition to the function of obtaining a reproduced color video signal having a high picture quality from three kinds of signals which are simultaneously reproduced from the plurality of independent tracks, there is a function of recording on and reproducing from at least one track out of the plurality of independent tracks a different information signal. The different information signal is different from the signals recorded on and reproduced from the remaining tracks, and this different information signal is recorded on (or reproduced from) the at least one track simultaneously as the signals which are recorded on (or reproduced from) the remaining tracks. For example, it is possible to simultaneously record (or reproduce) color video signals related to a plurality of mutually different television programs on the plurality of tracks. Hence, a luminance signal picked up by a television camera may be recorded on a certain track with a high picture quality while a color video signal related to a television program is recorded on other tracks, for example. As a result, it is possible to use the apparatus in an extremely wide range of applications.

Other objects and further features of the present invention will be apparent from the following detailed description when read in conjunction with the accompanying drawings.

BRIEF DESCRIPTION OF THE DRAWINGS

FIGS. 2(A) and 2(B) respectively show frequency spectrums of signals at essential parts of the block system shown in FIG. 1;

FIGS. 3A and 3B are a front view and a plan view respectively showing a first embodiment of a positional relationship of rotary heads which may be applied to the recording and reproducing apparatus according to the present invention;

FIG. 4 is a side view showing a state of contact between a magnetic tape and the rotary heads which may be applied to the recording and reproducing apparatus according to the present invention;

FIG. 6 shows a part of the track pattern shown in FIG. 5 on an enlarged scale;

FIG. 7 is a system block diagram showing a reproducing system of the first embodiment of the recording and reproducing apparatus according to the present invention;

FIGS. 8A and 8B are a front view and a side view respectively showing a second embodiment of the positional relationship of the rotary heads which may be applied to the recording and reproducing apparatus according to the present invention;

FIG. 9 shows a second embodiment of the track pattern which is formed on the magnetic tape by the recording and reproducing apparatus according to the present invention;

FIG. 10 is a system block diagram showing a second embodiment of the recording and reproducing apparatus according to the present invention;

FIGS. 11(A) and 11(B) respectively show frequency spectrums of signals at essential parts of the block system shown in FIG. 10;

DETAILED DESCRIPTION

Figure 1:
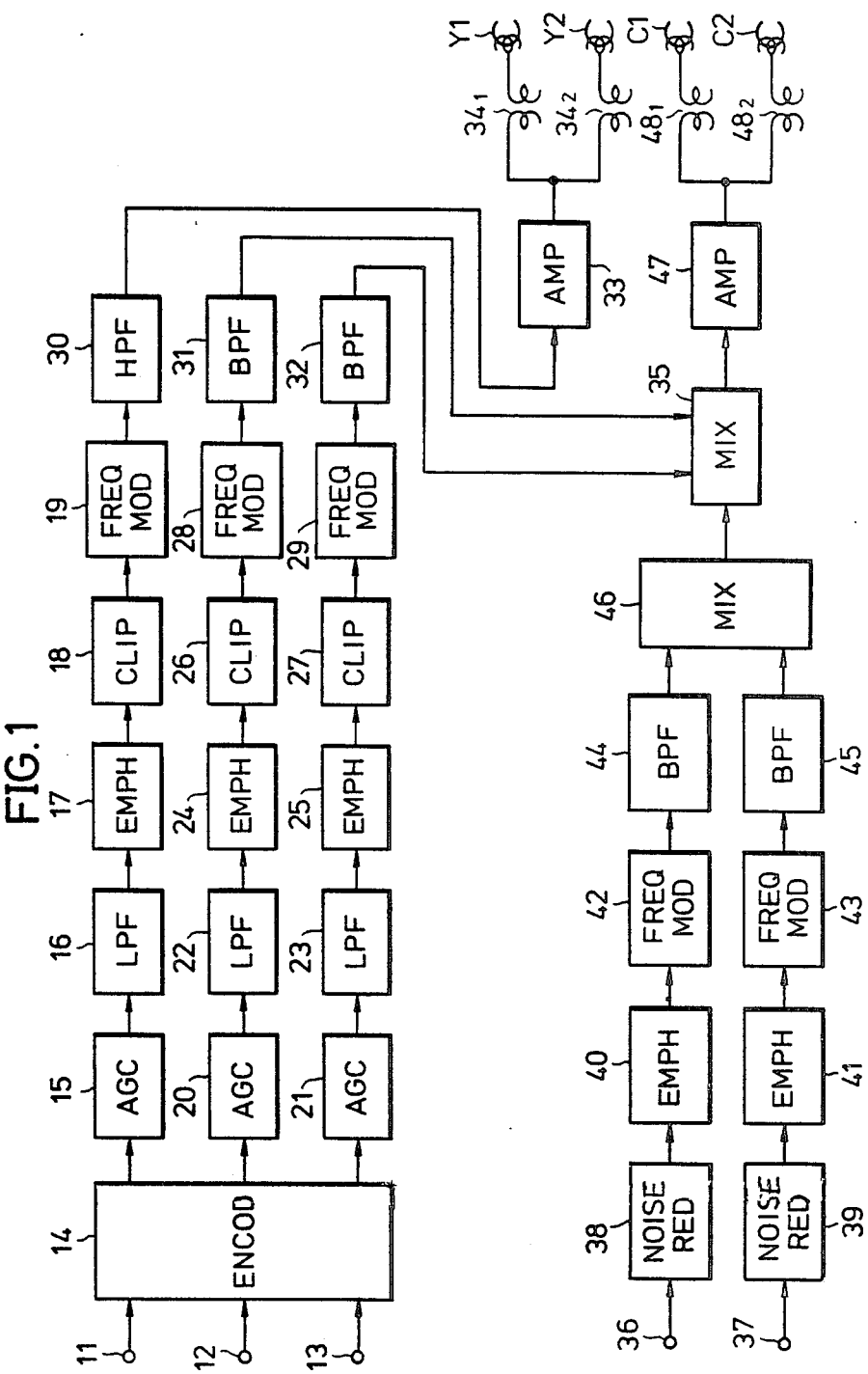
FIG. 1 is a system block diagram showing a recording system of a first embodiment of the recording and reproducing apparatus according to the present invention.

In FIG. 1, primary color signals of red (R), green (G) and blue (B) are respectively applied to input terminals 11, 12 and 13 and are converted into a luminance signal and two kinds of color difference signals (for example, color difference signals R-Y and B-Y) in an encoder 14. The luminance signal from the encoder 14 is passed through an automatic gain control (AGC) circuit 15, a lowpass filter 16, an emphasis circuit 17 and a white-dark clipping circuit 18, and is supplied to a frequency modulator 19. On the other hand, the two kinds of color difference signals R-Y and B-Y from the encoder 14 are passed through respective AGC circuits 20 and 21, lowpass filters 22 and 23, emphasis circuits 24 and 25 and white-dark clipping circuits 26 and 27, and are supplied to respective frequency modulators 28 and 29.

A frequency modulated (FM) luminance signal having a carrier deviation band I of 5 to 6 MHz and a lower sideband II as shown in FIG. 2(A) is obtained from the frequency modulator 19. This FM luminance signal is passed thorugh a highpass filter 30, a recording amplifier 33 and rotary transformers $34_1$ and $34_2$, and is supplied to first and second rotary heads Y1 and Y2 which will be described later on in the specification. On the other hand, first and second FM color difference signals are respectively obtained from the frequency modulators 28 and 29. In FIG. 2(B), a frequency spectrum of the first FM color difference signal which is obtained by frequency-modulating a first carrier by the color difference signal R-Y is indicated by III, and the first FM color difference signal has a carrier deviation band IIIc of 5 to 6 MHz. On the other hand, a frequency spectrum of the second FM color difference signal which is obtained by frequency-modulating a second carrier by the color difference signal B-Y is indicate by IV, and the first FM color difference signal has a carrier deviation band IIIc of 0.8 to 1.2 MHz. The first and second FM color difference signals respectively obtained from the frequency modulators 28 and 29 are passed through respective bandpass filters 31 and 32 and are supplied to a mixing circuit 35 wherein the signals are frequency-division-multiplexed.

First and second channel audio signals are respectively applied to input terminals 36 and 37, passed through noise reduction circuits 38 and 39 which perform a level compression so as to enable a noise reduction to be performed at the time of the reproduction and emphasis circuits 40 and 41 which emphasize the level of predetermined high frequency components and are supplied to frequency modulators 42 and 43. A first channel FM audio signal which is obtained by frequency-modulating a first carrier by the first channel audio signal and has a frequency spectrum V shown in FIG. 2(B) is obtained from the frequency modulator 42. In addition, a second channel FM audio signal which is obtained by frequency-modulating a second carrier by the second channel audio signal and has a frequency spectrum VI shown in FIG. 2(B) is obtained from the frequency modulator 43. The first and second channel FM signals from the frequency modulators 42 and 43 are respectively passed through bandpass filters 44 and 45 and are supplied to a mixing circuit 46 wherein the signals are frequency-division-multiplexed. A frequency division multiplexed signal from the mixing circuit 46 is supplied to the mixing circuit 35.

Accordingly, a frequency division multiplexed signal having a frequency spectrum shown in FIG. 2(B) is obtained from the mixing circuit 35. This frequency division multiplexed signal is passed through a recording amplifier 47 and rotary transformers $48_1$ and $48_2$ and is supplied to third and fourth rotary heads C1 and C2. The rotary heads Y1, Y2, C1 and C2 are mounted on an upper rotary drum 53 shown in FIGS. 3A and 3B. FIGS. 3A and 3B are a front view and a plan view respectively showing a first embodiment of a positional relationship of rotary heads which may be applied to the recording and reproducing apparatus according to the present invention. A rotary shaft 51 of a motor 50 penetrates a central part of a lower stationary drum 52 and is fixed to a central part of the rotary drum 53 which has a cylindrical shape and is used as a rotary body. Hence, only the rotary drum 53 is rotated by the motor 50. As shown in FIGS. 3A and 4, a tape guide 54 is provided on the stationary drum 52. A magnetic tape 55 is wrapped around the outer peripheral surfaces of the drums 52 and 53 over an angular range of approximatey 180°, and is moved in a state where the lower edge of the tape 55 is guided by the tape guide 54.

As shown in the plan view in FIG. 3B, the first and second rotary heads Y1 and Y2 are mounted at mutually opposing positions on a rotational plane of the rotary drum 53, and the third and fourth rotary heads C1 and C2 are also mounted at mutually opposing positions on the rotational plane of the rotary drum 53. As may be seen from FIG. 3A, the rotary heads Y1 and Y2 are mounted at the same height position, and the rotary heads C1 and C2 are mounted at the same height position. Further as may be seen from FIGS. 3A and 3B, the rotary heads Y1 and C1 are mounted at substantially the same position on the rotational plane but the height positions thereof are different in an axial direction of the rotary drum 53. Similarly, the rotary heads Y2 and C2 are mounted at substantially the same position on the rotational plane but the height positions thereof are different in the axial direction of the rotary drum 53. In addition, the rotary heads Y1, Y2, C1 and C2 have gaps of predetermined azimuth angles. For example, the rotary heads Y1, Y2, C1 and C2 respectively have gaps of azimuth angles of $+10°$, $-10°$, $+10°$ and $-10°$ with respect to zero azimuth angle, where a positive angle is taken clockwise from the zero azimuth angle and a negative angle is taken counterclockwise from the zero azimuth angle.

As shown in FIG. 4, the thickness of an air film formed between the tape 55 and the outer peripheral surface of the rotary drum 53 in a vicinity of the entrance part of the rotary drum 53 increases in an upward direction away from the tape guide 54.

Figure 5:
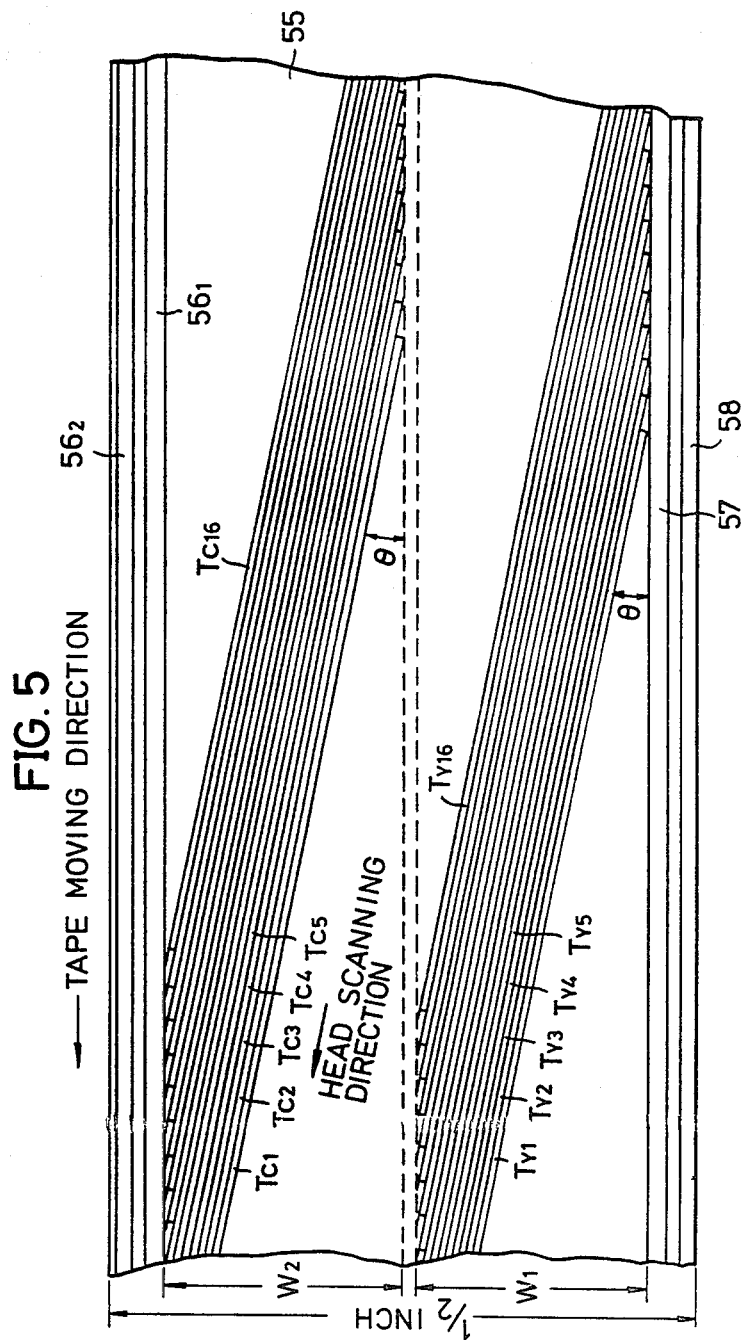
FIG. 5 shows a first embodiment of a track pattern which is formed on the magnetic tape by the recording and reproducing apparatus according to the present invention.

Next, description will be given with respect to the operation of the block system shown in FIG. 1 at the time of the recording. During the first one field, tracks $T_{Y1}$ and $T_{C1}$ shown in FIG. 5 are simultaneously and independently formed on the tape 55 by the respective rotary heads Y1 and C1. During the second one field, tracks $T_{Y2}$ and $T_{C2}$ shown in FIG. 5 are simultaneously and independently formed on the tape 55 by the respective rotary heads Y2 and C2. Similarly thereafter, the pair of rotary heads Y1 and C1 and the pair of rotary heads Y2 and C2 alternately form a pair of tracks for every one field, and tracks $T_{Y3}$ and $T_{C3}$, $T_{Y4}$ and $T_{C4}$, $T_{Y5}$ and $T_{C5}$, ... are successively formed on the tape 55 without guard bands. Out of the tracks formed in two recording regions W1 and W2 on the tape 55, the FM luminance signal having the frequency spectrum shown in FIG. 2(A) is recorded on the tracks $T_{Y1}$ through $T_{Y16}$ which are formed within the recording region W1 which is closer to the tape guide 54. On the other hand, the frequency division multiplexed signal which comprises the first and second FM color difference signals and the first and second channel FM audio signals and has the frequency spectrum shown in FIG. 2(B) is recorded on the tracks $T_{C1}$ through $T_{C16}$ which are formed within the recording region W2. The tracks are formed with an inclination angle $\theta$. In FIG. 5 and FIG. 9 which will be described later, only sixteen tracks are shown in one recording region, for convenience' sake.

As shown in FIG. 6 which shows a part of the track pattern shown in FIG. 5 on the enlarged scale, the horizontal synchronizing signals recorded on the tracks $T_{Y1}$ through $T_{Y16}$ are aligned in the track width direction. That is, the horizontal synchronizing signals are recorded with the so-called H-alignment.

In FIG. 5, tracks $56_1$, $56_2$, 57 and 58 are formed in a longitudinal direction of the tape 55 are formed by stationary heads which are used exclusively for recording and reproducing signals on and from these tracks. First and second channel audio signals are respectively recorded on the audio tracks $56_1$ and $56_2$. A time code for indicating a positional information on the tape 55 is recorded on the time code track 57. Further, a control pulse having a constant period is recorded on the control track 58.

Next, description will be given with respect to the construction and operation of a reproducing system which reproduces the recorded signals from the tape 55 having the track pattern shown in FIGS. 5 and 6. The tracks $T_{Y1}$ through $T_{Y16}$ on the tape 55 are alternately scanned by the rotary heads Y1 and Y2 for every one field. Reproduced FM luminance signals from the rotary heads Y1 and Y2 are passed through the respective rotary transformers $34_1$ and $34_2$, and a switching circuit (not shown) converts the reproduced FM luminance signals into a continuous signal. The output continuous signal of this switching circuit is passed through a reproducing preamplifier 60 shown in FIG. 7 and is supplied to a frequency demodulator 61. At the same time, the tracks $T_{C1}$ through $T_{C16}$ on the tape 55 are alternately scanned by the rotary heads C1 and C2 for every one field. Reproduced frequency division multiplexed signals from the rotary heads C1 and C2 are passed through the respective rotary transformers $48_1$ and $48_2$, and a switching circuit (not shown) converts the reproduced frequency division multiplexed signals into a continuous signal. The output continuous signal of this switching circuit is passed through a reproducing preamplifier 62 shown in FIG. 7 and is supplied to bandpass filters 63, 64, 65 and 66. The bandpass filters 63, 64, 65 and 66 respectively separate the first and second FM color difference signals and the first and second FM audio signals from the output signal of the reproducing preamplifier 62.

A reproduced luminanace signal obtained from the frequency demodulator 61 is passed through a lowpass filter 67 and a de-emphasis circuit 68 and is supplied to a decoder 69. On the other hand, the reproduced first FM color difference signal which is obtained from the bandpass filter 63 and has the frequency spectrum III shown in FIG. 2(B) is frequency-demodulated into a reproduced color difference signal R-Y in a frequency demodulator 70. The reproduced second FM color difference signal which is obtained from the bandpass filter 64 and has the frequency spectrum IV shown in FIG. 2(B) is frequency-demodulated into a reproduced color difference signal B-Y in a frequency demodulator 71. The reproduced color difference signals R-Y and B-Y are respectively passed through lowpass filters 72 and 73 and de-emphasis circuits 74 and 75 and are supplied to the decoder 69. The decoder 69 supplies primary color signals of red (R), green (G) and blue (B) to respective output terminals 76, 77 and 78.

On the other hand, the reproduced first and second channel FM audio signals which are respectively obtained from the bandpass filters 65 and 66 and have the frequency spectrums V and VI shown in FIG. 2(B) are independently frequency-demodulated into a reproduced first channel audio signal and a reproduced second channel audio signal in respective frequency demodulators 79 and 80. The reproduced first and second channel audio signals from the frequency demodulators 79 and 80 are respectively passed through de-emphasis circuits 81 and 82 wherein the signals are de-emphasized with characteristics complementary to those of the emphasis performed at the time of the recording and noise reduction circuits 83 and 84 wherein the noise is reduced, and are outputted through output terminals 85 and 86.

According to the present embodiment, a time base deviation (jitter) in the reproduced luminance signal from the tracks $T_{Y1}$ through $T_{Y16}$ in the recording region W1 which is closest to the tape guide 54 caused by the positional deviation as the tape 55 moves is smallest out of the reproduced signals from the tracks $T_{C1}$ through $T_{C16}$ in the recording region W2 due to the provision of the tape guide 54 which stably guides the lower part of the moving tape 55. Moreover, because the thickness of an air film formed between the tape 55 and the outer peripheral surfaces of the drums 52 and 53 is a minimum at the lower part of the tape 55 where the recording region W1 exists, the rotary heads Y1 and Y2 make stable contact with the tape 55 and it is thus possible to perform a satisfactory reproduction. The jitter in synchronizing signals and the like within the luminance signal which is reproduced from the tracks $T_{Y1}$ through $T_{Y16}$ in the recording region W1 is therefore kept to a minimum, and it is hence possible to stably obtain a reproduced color picture having a high picture quality.

Next, description will be given with respect to a second embodiment of the positional relationship of the rotary heads which may be applied to the recording and reproducing apparatus according to the present invention, by referring to FIGS. 8A and 8B. In the present embodiment, six rotary heads H1 through H6 are mounted on an upper rotary drum 90, and the embodiment is applied to the apparatus which forms a track pattern shown in FIG. 9. In FIGS. 8A and 8B, those parts which are the same as those corresponding parts in FIGS. 3A and 3B are designated by the same reference numerals, and description thereof will be omitted. As may be seen from FIGS. 8A and 8B, the rotary heads H1 through H6 are respectively mounted on a rotational plane of the upper rotary drum 90 so that the rotary heads H1 and H2 are mounted at the same height position, the rotary heads H3 and H4 are mounted at the same height position and the rotary heads H5 and H6 are mounted at the same height position. The rotary heads H1, H3 and H5 are mounted at mutually different height positions and are aligned in the axial direction of the rotary drum 90. Similarly, the rotary heads H2, H4 and H6 are mounted at mutually different height positions and are aligned in the axial direction of the rotary drum 90. The rotary heads H1 through H6 have gaps of predetermined azimuth angles. For example, the rotary heads H1 through H6 respectively have gaps of azimuth angles of $+10°$, $-10°$, $+10°$, $-10°$, $+10°$ and $-10°$ with respect to the zero azimuth angle, where the positive angle is taken clockwise from the zero azimuth angle and the negative angle is taken counterclockwise from the zero azimuth angle as described before.

The rotary heads H1 through H6 form on a magnetic tape 92 tracks T11 through T16 in a recording region Wa, tracks t21 through T216 in a recording region Wb and tracks T31 through T316 in a recording region Wc as shown in FIG. 9. The recording regions Wa, Wb and Wc are separated from each other in the tape width direction, and the tracks are formed without a guard band with an inclination angle $\alpha$ which is smaller than the angle $\theta$. The tracks T11 through T116 constitute a first group of tracks formed by the rotary heads H1 and H2, the tracks T21 through T216 constitute a second group of tracks formed by the rotary heads H3 and H4 and tracks T31 through T316 constitute a third group of tracks formed by the rotary heads H5 and H6.

Out of the recording regions Wa, Wb and Wc which are separated from each other in the tape width direction, the recording region Wa is closest to a tape guide 91 which is formed on a lower stationary drum 89 shown in FIGS. 8A and 8B. In the present embodiment, the FM luminance signal is recorded on the first group of tracks T11 through T116 in the recording region Wa. For example, a first frequency division multiplexed signal comprising the first FM color difference signal and the first channel FM audio signal is recorded on the second group of tracks T21 through T216 in the center recording region Wb. Furthermore, a second frequency division multiplexed signal comprising the second FM color difference signal and the second channel FM audio signal, for example, is recorded on the third group of tracks T31 through T316 in the recording region Wc.

As shown in FIG. 9, tracks $93_1$, $93_2$, 94 and 95 which are formed in the longitudinal direction of the tape 92 are formed by stationary heads which are used exclusively for recording and reproducing signals on and from these tracks. The first and second channel audio signals are respectively recorded on the audio tracks $93_1$ and $93_2$ by stationary audio heads. The audio tracks $93_1$ and $93_2$ are formed in the upper end portion of the tape 92 having the width of $\frac{1}{2}$ inch, for example. The time code for indicating the positional information on the tape 92 is recorded on the time code track 94 by a stationary time code head. Further, the control pulse having the constant period is recorded on the control track 95 by a stationary control head. The time code track 94 and the control track 95 are formed in the lower end portion of the tape 92.

According to the present embodiment, three tracks are simultaneously formed for every one field, and the FM luminance signal is recorded in the recording region Wa which is closest to the tape guide 91. For this reason, it is possible to obtain effects which are the same as the effects obtained in the first embodiment described before.

Because a recording system and a reproducing system for the signals which are recorded on and reproduced from the tracks on the tape having the track pattern shown in FIG. 9 can be easily derived from the recording system and the reproducing system described before in conjunction with FIGS. 1 and 7, description thereof will be omitted.

Next, description will be given with respect to a second embodiment of the recording and reproducing apparatus according to the present invention. In FIG. 10, the luminance signal, the color difference signal R-Y and the color difference signal B-Y are respectively applied to input terminals 100, 101 and 102 and are supplied to respective emphasis circuits 103, 104 and 105. As will be described later, the color difference signals R-Y and B-Y are recorded on one track but originally do not comprise synchronizing signals having a constant period. Hence, for the purpose of compensating the time in the present embodiment, synchronizing signals are generated from a synchronizing signal generating device 106 with a period of 1H (H represents one horizontal scanning period), for example, in correspondence with the horizontal synchronizing signals within the luminance signal. The synchronizing signals from the synchronizing signal generating device 106 are added to the color difference signal B-Y from the input terminal 102 before being supplied to the emphasis circuit 105. Predetermined high frequency components of the luminance signal, the color difference signal R-Y comprising no synchronizing signals and the color difference signal B-Y which is added with the synchronizing signals are emphasized in the respective emphasis circuits 103, 104 and 105, and output signals of the emphasis circuits 103, 104 and 105 are respectively supplied to frequency modulators 107, 108 and 109 wherein the signals are frequency-modulated.

FIG. 11(A) shows an example of a frequency spectrum of the FM luminance signal which is obtained from the frequency modulator 107. This frequency spectrum is the same as the frequency spectrum shown in FIG. 2(A). In FIG. 11(A), the carrier deviation band of 5 to 6 MHz is indicated by I, and the lower sideband of the FM luminance signal is indicated by II. The FM luminance signal is passed through a recording amplifier 110 and a rotary transformer (not shown), and is supplied to the rotary heads Y1 and Y2 having the construction shown in FIGS. 3A and 3B.

On the other hand, the first and second FM color difference signals are obtained from the frequency modulators 108 and 109. FIG. 11(B) shows an example of each of the frequency spectrums of the first and second FM color difference signals. The frequency spectrum shown in FIG. 11(B) are the same as the frequency spectrums shown in FIG. 2(B) with the frequency spectrums of the FM audio signals eliminated. In FIG. 11(B), the frequency spectrum of the first FM color difference signal which is obtained by frequency-modulating a first carrier by the color difference signal R-Y is indicated by III, and the carrier deviation band IIIc thereof is selected to 5 to 6 MHz. The frequency spectrum of the second FM color difference signal which is obtained by frequency-modulating a second carrier by the color difference signal B-Y which is added with the synchronizing signals is indicated by VII, and the carrier deviation band VIIc thereof is selected to 0.8 to 1.2 MHz. The first FM color difference signal from the frequency modulator 108 and the second FM color difference signal from the frequency modulator 109 are supplied to a mixing circuit 111 and are frequency-division-multiplexed. A frequency division multiplexed signal from the mixing circuit 111 is passed through a recording amplifier 112 and a rotary transformer (not shown), and is supplied to the rotary heads C1 and C2 shown in FIGS. 3A and 3B.

Accordingly, two independent oblique tracks are simultaneously formed on a magnetic tape 113 for every one field, and a track pattern identical to that shown in FIG. 5 is formed. In the present embodiment, the FM luminance signal is recorded on tracks corresponding to the tracks $T_{Y1}$ through $T_{Y16}$ shown in FIG. 5. The frequency division multiplexed signal having the frequency spectrum shown in FIG. 11(B) is recorded on tracks corresponding to the tracks $T_{C1}$ through $T_{C16}$ shown in FIG. 5. Furthermore, the synchronizing signals within the color difference signal B-Y which is recorded on the tracks corresponding to the tracks $T_{C1}$ through $T_{C16}$ shown in FIG. 5 are aligned in the track width direction, similarly as in the case of the H-alignment recording of the horizontal synchronizing signals shown in FIG. 6.

Next, description will be given with respect to the operation at the time of the reproduction. The FM luminance signal is alternately reproduced by the rotary heads Y1 and Y2 from the tracks in one of the recording regions on the tape 113 for every one field. The alternately reproduced FM luminance signals are passed through a rotary transformer (not shown) and a switching circuit (not shown) for forming the alternately reproduced FM luminance signals into a continuous signal. This continuous reproduced luminance signal is passed through a reproducing preamplifier 114 shown in FIG. 10 and is supplied to a frequency demodulator 115. At the same time, the frequency division multiplexed signal is alternately reproduced by the rotary heads C1 and C2 from the tracks in the other of the recording regions on the tape 113 for every one field. The alternately reproduced frequency division multiplexed signals are passed through a rotary transformer (not shown) and a switching circuit (not shown) for forming the alternately reproduced frequency division multiplexed signals into a continuous signal. This continuous reproduced frequency division multiplexed signal is passed through a reproducing preamplifier 123 shown in FIG. 10 and is supplied to bandpass filter 124 and 125 wherein the reproduced first and second FM color difference signals are separated.

A reproduced luminance signal which is obtained from the frequency demodulator 115 by the frequency demodulation performed therein is passed through a de-emphasis circuit 116 and a lowpass filter 117 and is supplied to a charge coupled device (CCD) 118. The CCD 118 is supplied with an output clock pulse of a clock pulse generator 119 having a frequency of 14.3 MHz, for example, and delays the reproduced luminance signal by a delay time of H/2. A delayed reproduced luminance signal from the CCD 118 is passed through a lowpass filter 120 which eliminates the clock pulse frequency component, and is outputted through an output terminal 121. The output signal of the lowpass filter 120 is also supplied to a horizontal synchronizing signal separating circuit 122.

On the other hand, the reproduced first FM color difference signal obtained from the bandpass filter 124 is supplied to a frequency demodulator 126, while the reproduced second FM color difference signal obtained from the bandpass filter 125 is supplied to a trap circuit 130 and a synchronizing signal separating circuit 131. The reproduced second FM color difference signal is eliminated of the synchronizing signals in the trap circuit 130, and the output reproduced second FM color difference signal of the trap circuit 130 is supplied to a frequency demodulator 132. Hence, reproduced color difference signals R-Y and B-Y are obtained from the respective frequency demodulators 126 and 132, respectively passed through de-emphasis circuits 127 and 133 and lowpass filters 128 and 134 and respectively supplied to CCDs 129 and 135. The CCDs 129 and 135 constitute variable delay circuits. The synchronizing signal separating circuit 131 frequency-demodulates the reproduced second FM color difference signal, separates the synchronizing signals which are added within the reproduced color difference signal B-Y and supplies the separated synchronizing signals to a phase comparator 136. The phase comparator 136 compares the phase of the reproduced horizontal synchronizing signals from the horizontal synchronizing signal separating circuit 122 and the phase of the reproduced synchronizing signals from the synchronizing signal separating circuit 131 and produces a phase error voltage responsive to the phase error. The output phase error voltage of the phase comparator 136 is supplied to a voltage controlled oscillator (VCO) 137 as a control voltage and variably controls the repetition frequency (oscillation frequency) of the output pulse of the VCO 137.

The output pulse of the VCO 137 is supplied to the CCDs 129 and 135 as a clock pulse. The CCDs 129 and 135 respectively delay an input signal thereof by a delay time which is determined by a product of the number of stages and the period of the clock pulse. Hence, the delay times of the CCDs 129 and 135 are variably controlled inversely proportional to the repetition frequency of the output pulse of the VCO 137. The phase comparator 136 uses as a reference the reproduced horizontal synchronizing signals which are obtained from the signal reproduced from the tracks corresponding to the tracks $T_{Y1}$ through $T_{Y16}$, and detects the phase error (that is, the time error) of the reproduced synchronizing signals which are obtained from the signal reproduced from the tracks corresponding to the tracks $T_{C1}$ through $T_{C16}$. The detected phase error voltage is passed through the VCO 137 and is supplied to the CCDs 129 and 135 to variably control the delay times thereof. Hence, the input reproduced color difference signals R-Y and B-Y of the CCDs 129 and 135 are delayed by delay times necessary for matching the timings (phases) thereof with the reproduced luminance signal. The reproduced color difference signals R-Y and B-Y obtained from the respective CCDs 129 and 135 are respectively passed through lowpass filters 138 and 139 for eliminating the clock pulse frequency component and are outputted through output terminals 140 and 141. The synchronizing signals may be added to the color difference signal R-Y instead, and furthermore, the synchronizing signals may be added to both the color difference signals R-Y and B-Y.

Figure 12:
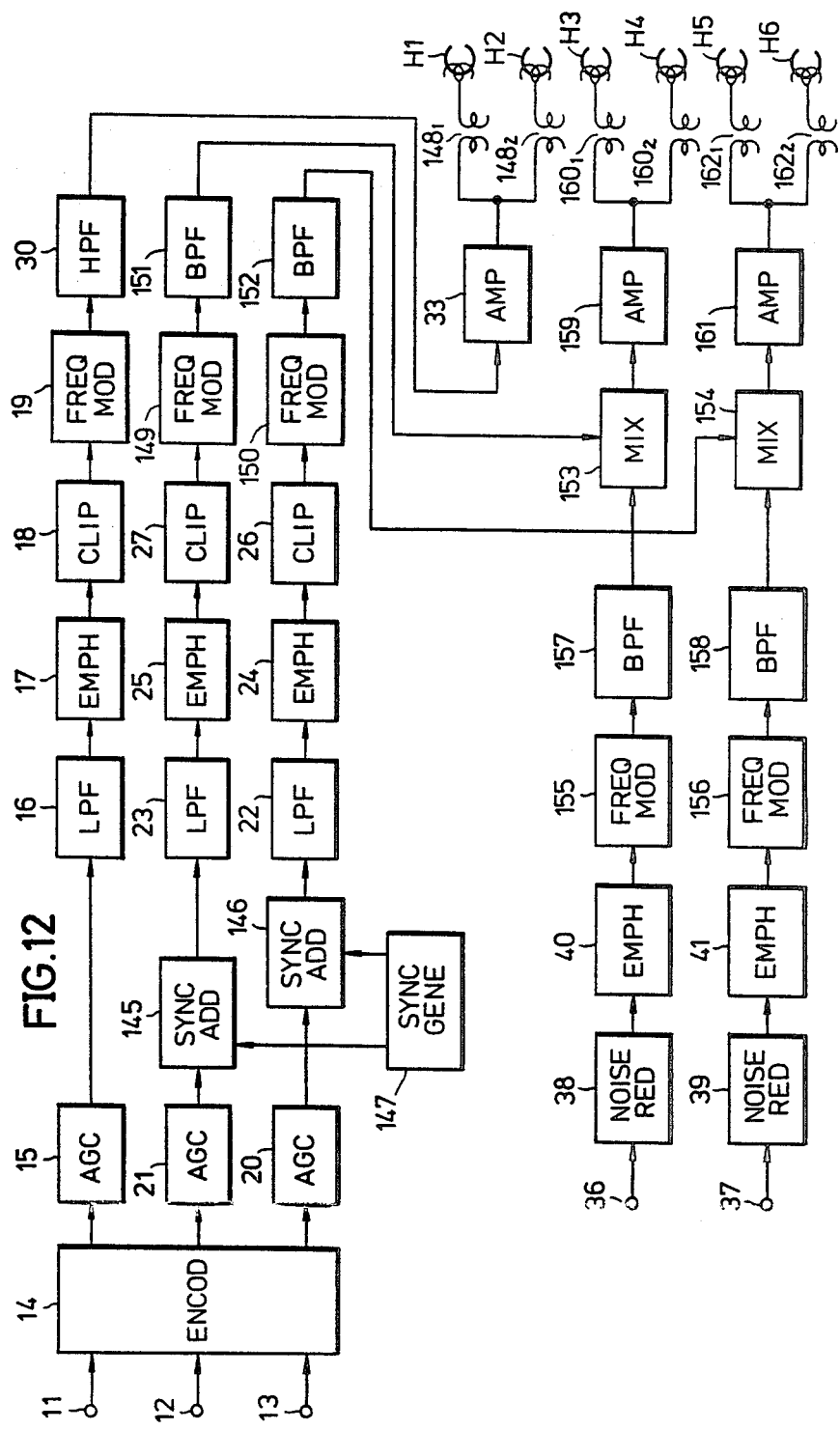
FIG. 12 is a system block diagram showing a recording system of a third embodiment of the recording and reproducing apparatus according to the present invention.

Next, description will be given with respect to a third embodiment of the recording and reproducing apparatus according to the present invention. FIG. 12 is a system block diagram showing a recording system of the third embodiment. In FIG. 12, those parts which are the same as those corresponding parts in FIG. 1 are designated by the same reference numerals, and description thereof will be omitted. In FIG. 12, a synchronizing signal adding circuit 145 adds synchronizing signals to the color difference signal B-Y which is obtained from the AGC circuit 21. A synchronizing signal adding circuit 146 adds synchronizing signals to the color difference signal R-Y which is obtained from the AGC circuit 20. A synchronizing signal generator 147 generates synchronizing signals corresponding to the horizontal synchronizing signals within the luminance signal shown in FIG. 13(A).

Figure 13:
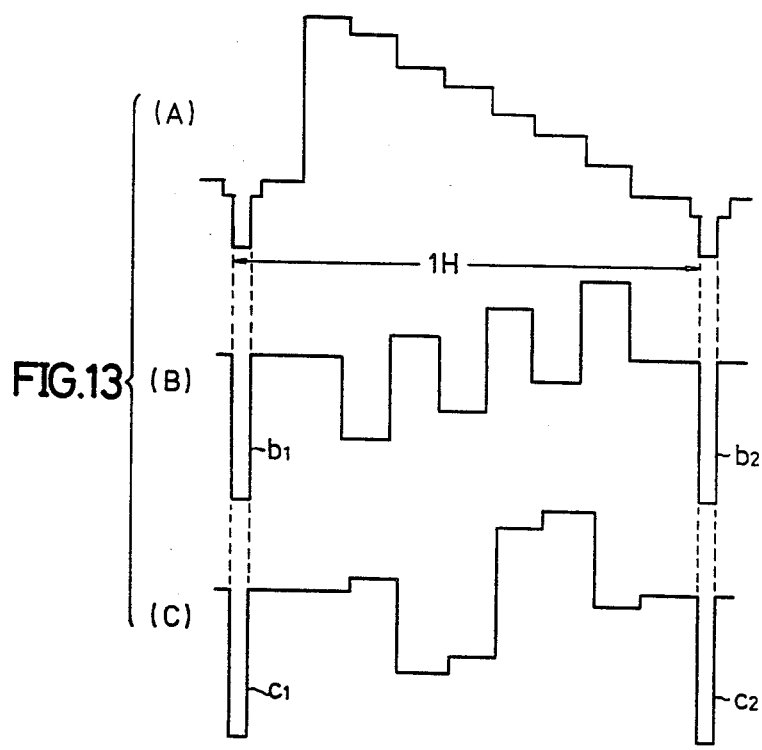
FIGS. 13(A) through 13(C) respectively show signal waveforms for explaining the operation of the block system shown in FIG. 12.

Accordingly, a color difference signal B-Y which is added with synchronizing signals b1 and b2 as shown in FIG. 13(B) is obtained from the synchronizing signal adding circuit 145. This color difference signal B-Y from the synchronizing signal adding circuit 145 is passed through the lowpass filter 23, the emphasis circuit 25 and the white-dark clipping circuit 27 and is supplied to a frequency modulator 149. At the same time, a color difference signal R-Y which is added with synchronizing signals c1 and c2 as shown in FIG. 13(C) is obtained from the synchronizing signal adding circuit 146. This color difference signal R-Y from the synchronizing signal adding circuit 146 is passed through the lowpass filter 22, the emphasis circuit 24 and the white-dark clipping circuit 26 and is supplied to a frequency modulator 150.

Figure 14:
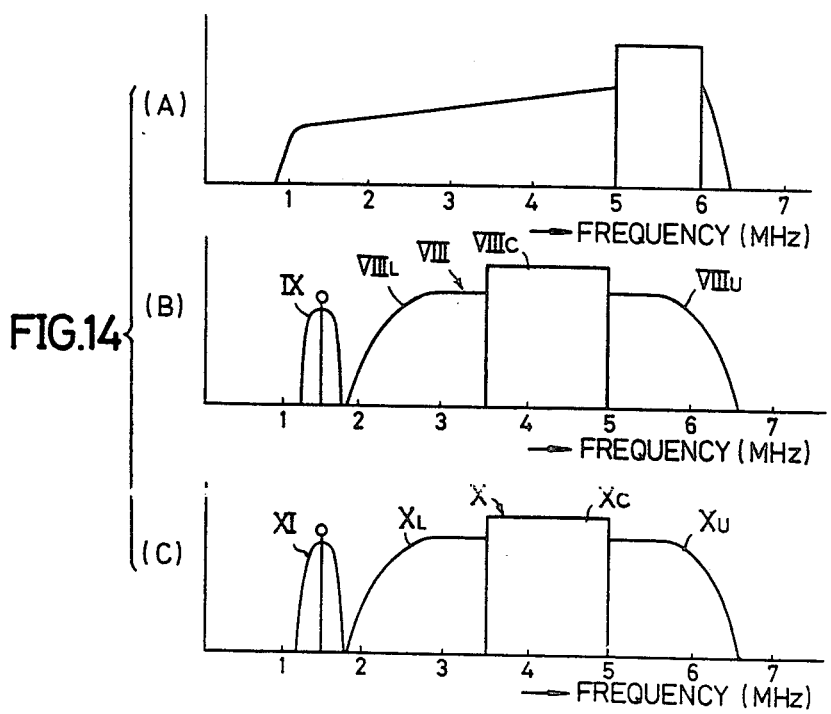
FIGS. 14(A) through 14(C) respectively show frequency spectrums of signals at essential parts of the block system shown in FIG. 12.

An FM luminance signal having a carrier deviation band of 5 to 6 MHz as shown in FIGS. 14(A) and 2(A) is obtained from the frequency modulator 19. The FM luminance signal is passed through the highpass filter 30, the recording amplifier 33 and rotary transformers $148_1$ and $148_2$ and is supplied to the first and second rotary heads H1 and H2. On the other hand, a first FM color difference signal having a carrier deviation band VIIIc of 3.5 to 5 MHz, an upper sideband $VIII_U$ and a lower sideband $VIII_L$ as shown in FIG. 14(B) is obtained from the frequency modulator 149. A second FM color difference signal having a carrier deviation band Xc of 3.5 to 5 MHz, an upper sideband $X_U$ and a lower sideband $X_L$ as shown in FIG. 14(C) is obtained from the frequency modulator 150. The first and second FM color difference signals are passed through respective bandpass filters 151 and 152 and are supplied to respective mixing circuits 153 and 154.

On the other hand, the first and second channel audio signals are respectively applied to the input terminals 36 and 37, passed through the noise reduction circuits 38 and 39, the emphasis circuits 40 and 41, frequency modulators 155 and 156 and bandpass filters 157 and 158 and supplied to the mixing circuits 153 and 154. Thus, a first frequency division multiplexed signal of the first FM color difference signal having the frequency spectrum VIII shown in FIG. 14(B) and the first channel FM audio signal having a frequency spectrum IX is obtained from the mixing circuit 153. This first frequency division multiplexed signal is passed through a recording amplifier 159 and rotary transformers $160_1$ and $160_2$ and is supplied to the third and fourth rotary heads H3 and H4. A second frequency division multiplexed signal of the second FM color difference signal having the frequency spectrum X shown in FIG. 14(C) and the second channel FM audio signal having a frequency spectrum XI is obtained from the mixing circuit 154. This second frequency division multiplexed signal is passed through a recording amplifier 161 and rotary transformers $162_1$ and $162_2$ and is supplied to the fifth and sixth rotary heads H5 and H6.

The first through sixth rotary heads H1 through H6 are mounted on the rotary drum 90 as shown in FIGS.

8A and 8B described before. Hence, the track pattern shown in FIG. 9 is formed on the tape. In the present embodiment, the FM luminance signal is recorded on the tracks in the recording region Wa of the tape shown in FIG. 9 by the rotary heads H1 and H2. The first frequency division multiplexed signal having the frequency spectrum shown in FIG. 14(B) is recorded on the tracks in the recording region Wb of the tape shown in FIG. 9 by the rotary heads H3 and H4. Furthermore, the second frequency division multiplexed signal having the frequency spectrum shown in FIG. 14(C) is recorded on the tracks in the recording region Wc of the tape shown in FIG. 9 by the rotary heads H5 and H6.

Figure 15:
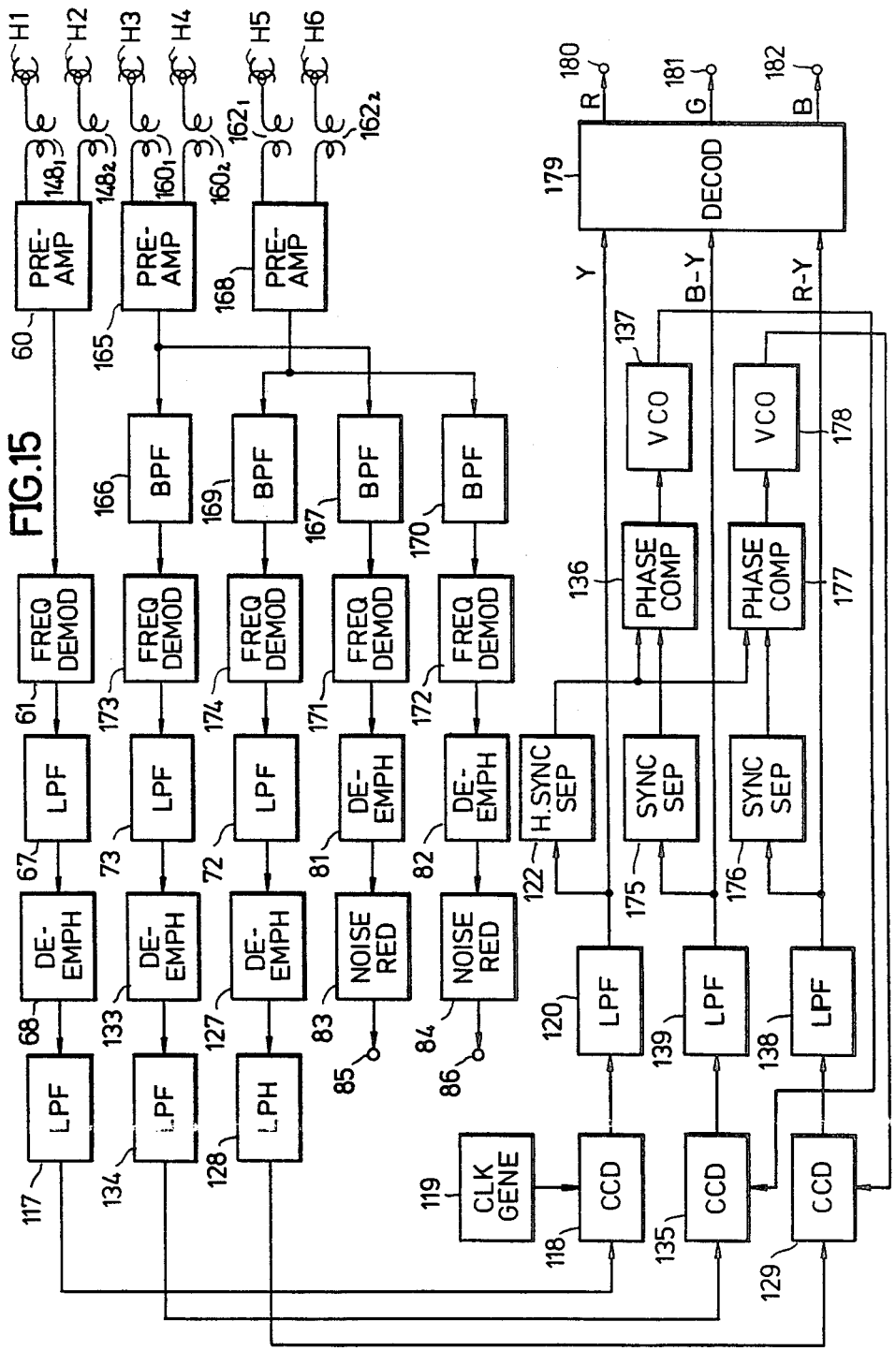
FIG. 15 is a system block diagram showing a reproducing system of the third embodiment of the recording and reproducing apparatus according to the present invention.

Next, description will be given with respect to a reproducing system of the third embodiment of the recording and reproducing apparatus according to the present invention by referring to FIG. 15. In FIG. 15, those parts which are the same as those corresponding parts in FIGS. 7, 10 and 12 are designated by the same reference numerals, and description thereof will be omitted. The first frequency division multiplexed signal which is successively reproduced from the second group of tracks by the rotary heads H3 and H4 is passed through the rotary transformers $160_1$ and $160_2$ and a preamplifier 165 and is supplied to bandpass filters 166 and 167. The bandpass filters 166 and 167 respectively separate the first FM color difference signal and the first channel FM audio signal having the frequency spectrums shown in FIG. 14(B). Similarly, the second frequency division multiplexed signal which is successively reproduced from the third group of tracks by the rotary heads H5 and H6 is passed through the rotary transformers $162_1$ and $162_2$ and a preamplifier 168 and is supplied to bandpass filters 169 and 170. The bandpass filters 167 and 170 respectively separate the second FM color difference signal and the second channel FM audio signal having the frequency spectrums shown in FIG. 14(C). The reproduced first and second channel FM audio signals from the bandpass filters 167 and 170 are respectively passed through frequency demodulators 171 and 172 and the de-emphasis circuits 81 and 82.

On the other hand, the reproduced first and second FM color difference signals from the bandpass filters 166 and 169 are respectively frequency-demodulated into reproduced color difference signals B-Y and R-Y in frequency demodulators 173 and 174. The reproduced color difference signals B-Y and R-Y are passed through the respective lowpass filters 73 and 72 and are supplied to the respective de-emphasis circuits 133 and 127.

A synchronizing signal separating circuit 175 separates and supplies to the phase comparator 136 the synchronizing signals b1 and b2 shown in FIG. 13(B) which are separated from the reproduced color difference signal B-Y obtained from the lowpass filter 139. Hence, the phase comparator 136 produces a phase error voltage responsive to a time error between the signals reproduced from the first group of tracks and the second group of tracks. The output phase error voltage of the phase comparator 136 is supplied to the VCO 137 to variably control the repetition frequency of the output clock pulse thereof. As a result, the delay time of the CCD 135 is controlled so that the timings (phases) of the reproduced color difference signal B-Y from the CCD 135 and the reproduced luminance signal from the lowpass filter 120 coincide.

A synchronizing signal separating circuit 176 separates and supplies to a phase comparator 177 the synchronizing signals c1 and c2 shown in FIG. 13(C) which are separated from the reproduced color difference signal R-Y obtained from the lowpass filter 138. The phase comparator 177 compares the phase of the separated synchronizing signals c1 and c2 and the phase of the reproduced horizontal synchronizing signals. Hence, the phase comparator 177 produces a phase error voltage responsive to a time error between the signals reproduced from the first group of tracks and the third group of tracks. The output phase error voltage of the phase comparator 177 is supplied to a VCO 178 to variably control the repetition frequency of the output clock pulse thereof. As a result, the delay time of the CCD 129 is controlled so that the timings (phases) of the reproduced color difference signal R-Y from the CCD 129 and the reproduced luminance signal from the lowpass filter 120 coincide.

Accordingly, the reproduced color difference signals B-Y and R-Y which are delayed in the respective CCDs 135 and 129 so as to match the timings (phases) thereof with the timing of the reproduced luminance signal are passed through the respective lowpass filter 139 and 138 and are supplied to a decoder 179 which is also supplied with the reproduced luminance signal from the lowpass filter 120. The signals supplied to the decoder 179 are converted into three primary color signals and are independently outputted through respective output terminals 180, 181 and 182.

According to the second and third embodiments, out of the signals reproduced from the tracks in the recording regions which are separated from each other in the tape width direction, the reproduced luminance signal is used as the reference and the timings (phases) of the color difference signals reproduced from the remaining tracks are matched with the timing (phase) of the reproduced luminance signal. In other words, the horizontal synchronizing signals within the reproduced luminance signal are used as the reference and the timings (phases) of the synchronizing signals in the color difference signals reproduced from the remaining tracks are matched with the timing (phase) of the horizontal synchronizing signals. For this reason, even when the jitter quantity differs between two points which are separated in the tape width direction, it is possible to eliminate the relative difference in the jitters at the two points.

Figure 16:
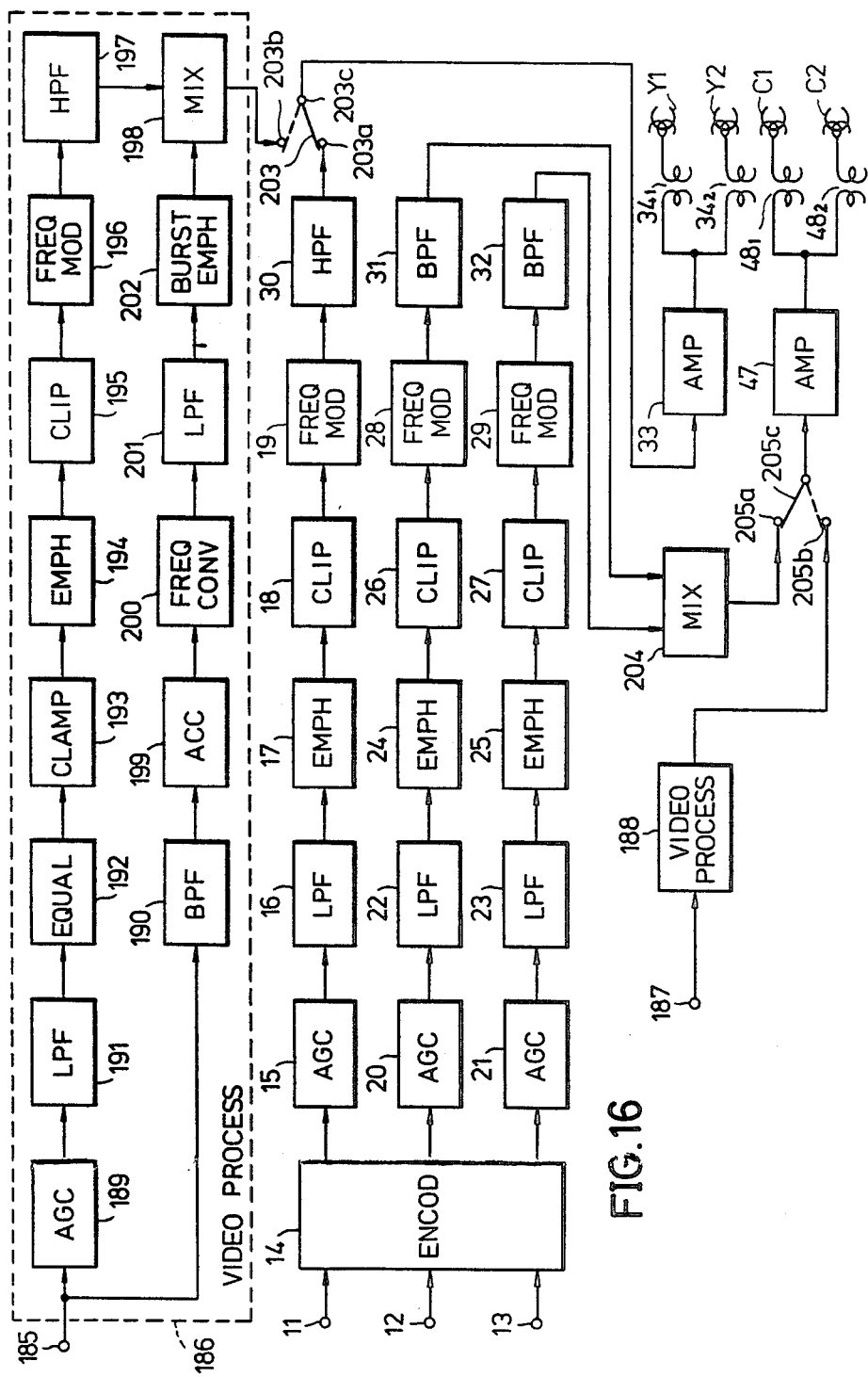
FIG. 16 is a system block diagram showing a recording system of a fourth embodiment of the recording and reproducing apparatus according to the present invention.
Figure 17:
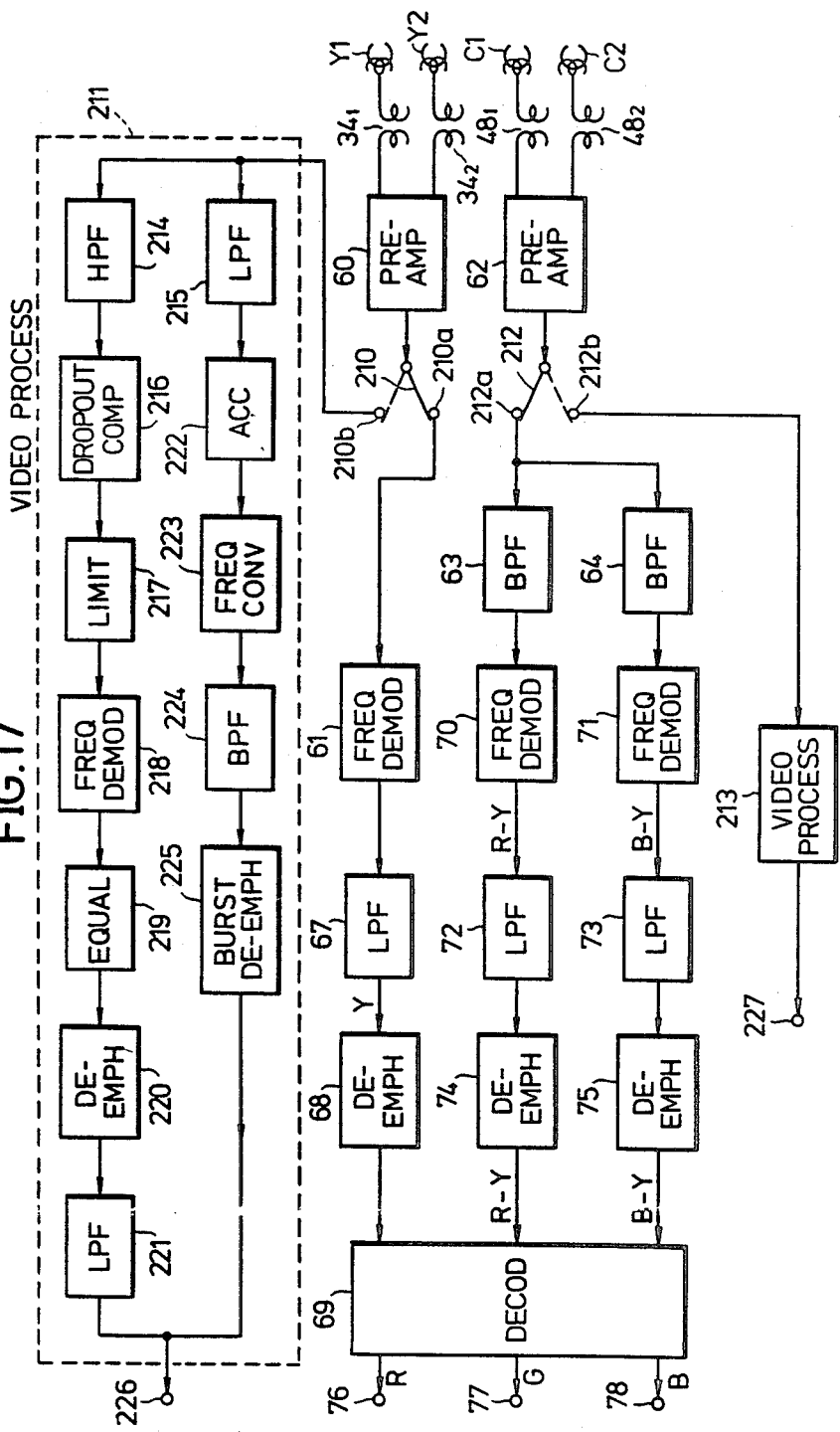
FIG. 17 is a system block diagram showing a reproducing system of the fourth embodiment of the recording and reproducing apparatus according to the present invention.

Next, description will be given with respect to a fourth embodiment of the recording and reproducing apparatus according to the present invention by referring to FIGS. 16 and 17. FIG. 16 shows a recording system of the fourth embodiment. In FIG. 16, those parts which are the same as those corresponding parts in FIG. 1 are designated by the same reference numerals, and description thereof will be omitted. In FIG. 16, a composite color video signal applied to an input terminal 185 is subjected a signal processing similar to the low-band conversion processing performed in a VTR for home use at the time of the recording, for example, and is converted into a second frequency division multiplexed signal in a recording color video signal processing circuit 186 which processes the signal to be recorded. On the other hand, a composite color video signal applied to an input terminal 187 is subjected to a low-band conversion processing and is converted into a third frequency division multiplexed signal in a recording color video signal processing circuit 188 which processes the signal to be recorded.

The construction of the color video signal processing circuit 188 is the same as that of the color video signal processing circuit 186, and thus, description will only be given with respect to the construction of the color video signal processing circuit 186. In FIG. 16, the composite color video signal applied to the input terminal 185 is supplied to an AGC circuit 189 and a bandpass filter 190. The level fluctuation in the composite color video signal is eliminated in the AGC circuit 189, and a lowpass filter 191 separates the luminance signal from the output composite color video signal of the AGC circuit 189. The luminance signal from the lowpass filter 191 is passed through an equalizer circuit 192, a clamping circuit 193, an emphasis circuit 194 and a white-dark clipping circuit 195 and is supplied to a frequency modulator 196. An FM luminance obtained from the frequency modulator 196 is supplied to a highpass filter 197 wherein the low frequency component in the frequency band of the frequency converted carrier chrominance signal is sufficiently eliminated, and is thereafter supplied to a mixing circuit 198.

On the other hand, the carrier chrominance signal obtained from the bandpass filter 190 is supplied to an AGC circuit 199 wherein the level fluctuation in the color burst signal is eliminated. The output carrier chrominance signal of the AGC circuit 199 is frequency-converted in a frequency converter 200, and is thereafter supplied to a lowpass filter 201 which obtains only the frequency converted carrier chrominance signal which has been frequency-converted into the low frequency range. The frequency converted carrier chrominance signal from the lowpass filter 201 is passed through a burst emphasis circuit 202 and is supplied to the mixing circuit 198. The mixing circuit 198 frequency-division-multiplexes the FM luminance signal from the highpass filter 197 and the frequency converted carrier chrominace signal from the burst emphasis circuit 202. The second frequency division multiplexed signal obtained from the mixing circuit 198 is supplied to a terminal 203b of a switch 203. The frequency spectrum of the second frequency division multiplexed signal is similar to the frequency spectrum of the signal which is recorded and reproduced on the VTR which employs the low-band conversion system and is known, and for this reason, illustration and description of the frequency spectrum of the second frequency division multiplexed signal will be omitted.

The FM luminance signal which has the frequency spectrum shown in FIG. 2(A) and is obtained from the highpass filter 30 is supplied to a terminal 203a of the switch 203. The FM luminance signal or the second frequency division multiplexed signal which is obtained through a common terminal 203c of the switch 203 is passed through the recording amplifier 33 and the rotary transformers $34_1$ and $34_2$ and is supplied to the rotary heads Y1 and Y2 described before.

On the other hand, the first and second FM color difference signals obtained from the respective bandpass filters 31 and 32 are multilplexed in a mixing circuit 204, and an output first frequency division multiplexed signal of the mixing circuit 204 is supplied to a terminal 205a of a switch 205. The switching of the switch 205 is independent of the switching of the switch 203. The switch 205 selectively supplies to the recording amplifier 47 one of the first frequency division multiplexed signal obtained from the terminal 205a and the third frequency division multiplexed signal obtained from a terminal 205b of the switch 205. As a result, the track pattern shown in FIG. 5 is formed on the tape according to the present embodiment.

In the case where the switches 203 and 205 are respectively connected to the terminals 203a and 205a, the construction of the system is substantially the same as that of the first embodiment, except for the fact that the tracks $T_{C1}$ through $T_{C16}$ are not recorded with the FM audio signal as in the case of the first embodiment. However, by connecting the switch 203 to the terminal 203b, it is possible to record the second frequency division multiplexed signal which is obtained by processing in the color video signal processing circuit 186 the composite color video signal applied to the input terminal 185. Similarly, by connecting the switch 205 to the terminal 205b, it is possible to record on the tracks $T_{C1}$ through $T_{C16}$ shown in FIG. 5 the third frequency division multiplexed signal which is obtained by processing the color video signal processing circuit 188 the composite color video signal applied to the input terminal 187. Accordingly, in the case where the switch 203 is connected to the terminal 203a and the switch 205 is connected to the terminal 205b, it is possible to record the output luminance signal of the encoder 14 on the tracks $T_{Y1}$ through $T_{C16}$ and at the same time record on the tracks $T_{C1}$ through $T_{C16}$ the third frequency division multiplexed signal which is derived from the composite color video signal applied to the input terminal 187.

Next, description will be given with respect to a reproducing system of the fourth embodiment of the recording and reproducing apparatus according to the present invention, by referring to FIG. 17. In FIG. 17, those parts which are the same as those corresponding parts in FIG. 7 are designated by the same reference numerals, and description thereof will be omitted. In the case where the FM luminance signal is recorded on the tracks $T_{Y1}$ through $T_{Y16}$, a switch 210 is connected to a terminal 210a thereof, and the reproduced signal is selectively supplied to the frequency demodulator 61. In the case where the second frequency division multiplexed signal is recorded on the tracks $T_{Y1}$ through $T_{Y16}$, the switch 210 is connected to a terminal 210b thereof, and the reproduced signal is selectively supplied to a reproduced color video signal processing circuit 211 for processing the reproduced signal. On the other hand, in the case where the first and second FM luminance signals are recorded on the tracks $T_{C1}$ through $T_{C16}$, a switch 212 is connected to a terminal 212a thereof, and the reproduced signal is selectively supplied to the bandpass filters 63 and 64. Furthermore, in the case where the third frequency division multiplexed signal comprising the FM luminance signal and the frequency converted carrier chrominance signal is recorded on the tracks $T_{C1}$ through $T_{C16}$, the switch 212 is connected to a terminal 212b thereof, and the reproduced signal is selectively supplied to a reproduced color video signal processing circuit 213 for processing the reproduced signal.

The switching of the switch 210 is independent of the switching of the switch 212. When it is assumed that the switches 210 and 212 are respectively connected to the terminals 210b and 212b, the reproduced signals from the rotary heads Y1 and Y2 are supplied to the color video signal processing circuit 211 and the reproduced signals from the rotary heads C1 and C2 are supplied to the color video signal processing circuit 213. The color video signal processing circuits 211 and 213 have the same circuit construction which is known and is similar to that of a reproducing system of the existing VTR which employs the low-band conversion system. Accordingly, description will be given only with respect to the operation of the color video signal processing circuit 211. The reproduced signal from the switch 210 is supplied to a highpass filter 214 wherein the FM luminance signal is separated and to a lowpass filter 215 wherein the frequency converted carrier chrominance signal is separated. The reproduced FM luminance signal obtained from the highpass filter 214 is passed through a dropout compensation circuit 216, a limiter 217 and a frequency demodulator 218 so as to obtain a reproduced luminance signal having no dropouts. The output luminance signal of the frequency demodulator 218 is passed through an equalizer circuit 219 and a de-emphasis circuit 220 and is supplied to a lowpass filter 221.

The reproduced frequency converted carrier chrominance signal obtained from the lowpass filter 215 is passed through an automatic chrominance control (ACC) circuit 222, a frequency converter 223 and a bandpass filter 224 so as to obtain a reproduced carrier chrominance signal which is restored to the original frequency band. The reproduced carrier chrominance signal from the bandpass filter 224 is passed through a burst de-emphasis circuit 225 and is multiplexed with the reproduced luminance signal from the lowpass filter 221 so as to obtain a reproduced composite color video signal. This reproduced composite color video signal is outputted through an output terminal 226. Similarly, a reproduced composite color video signal is obtained from the color video signal processing circuit 213 and is outputted through an output terminal 227.

It is possible to apply the fourth embodiment to the recording and reproducing apparatus comprising the rotary heads H1 through H6 shown in FIGS. 8A and 8B. In this case, in addition to the recording and reproducing systems in which the luminance signal and the carrier chrominance signal are separately processed, independent recording and reproducing systems employing the low-band conversion system may be added, for example.

In each of the embodiments described heretofore, an I-signal and a Q-signal may be used as the first and second color difference signals. Moreover, it is possible to record and reproduce the two kinds of color difference signals which are time-division-multiplexed instead of being frequency-division-multiplexed.

The signal which is switched over and recorded and reproduced is not limited to the frequency division multiplexed signal of the frequency converted carrier chrominance signal and the FM luminance signal, but may be video signals having other signal formats. In addition, it is possible to record and reproduce an information signal other than the video signal, such as an analog audio signal or a digital audio signal.

The signal which is recorded and reproduced by the rotary heads C1 and C2 simply needs to be a chrominance signal. For example, the signal which is recorded and reproduced by the rotary heads C1 and C2 may be a multiplexed signal of the frequency converted carrier chrominance signal and a bias signal, an FM frequency converted carrier chrominance signal which is obtained by frequency-modulating a carrier by the frequency converted carrier chrominance signal, and FM line-sequential color difference signal, a multiplexed signal of three kinds of FM signals which are obtained by independently frequency-modulating the three primary color signals and the like. Furthermore, the signal which is recorded and reproduced by the rotary heads H1 through H6 simply needs to be the three kinds of signals constituting the color video signal. Hence, the signal which is recorded and reproduced by the rotary heads H1 through H6 may be three kinds of FM primary color signals which are obtained by independently frequency-modulating the three primary color signals. The rotary heads C1, C2, Y1, Y2 and H1 through H6 may be mounted on a rotary body other than the rotary drum described before. For example, the rotary heads may be mounted on a flat rectangular head bar which is arranged in two or three stages. In addition, the rotary heads C1, C2, Y1, Y2 and H1 through H6 may have gaps of the same azimuth angle and form a track pattern in which a guard band is provided between mutually adjacent tracks. It is not essential for the azimuth angles of the gaps of the rotary heads Y1 and C1, the rotary heads Y2 and C2, the rotary heads H1, H3 and H5 and the rotary heads H2, H4 and H6 to be selected to the same azimuth angle.

Further, the present invention is not limited to these embodiments, but various variations and modifications may be made without departing from the scope of the present invention.

What is claimed is:

1. A magnetic recording and reproducing apparatus comprising:
   a rotary body wrapped with a magnetic tape on an outer peripheral surface thereof over a predetermined angular range, said rotary body having a tape guide for guiding a part of the magnetic tape;
   n pairs of rotary heads mounted on said rotary body, where n is an integer greater than or equal to two, each pair out of said n pairs of rotary heads being constituted by two rotary heads which are mounted at mutually opposite positions on a rotational plane of said rotary body at the same height position, each pair out of said n pairs of rotary heads being mounted at different positions in an axial direction of said rotary body, said n pairs of rotary heads recording a luminance signal and two kinds of signals constituting a color video signal on the magnetic tape by simultaneously forming first through n-th groups of tracks at the time of a recording and simultaneously reproducing the recorded signals from the first through the n-th groups of tracks at the time of a reproduction, said first through n-th groups of tracks being independent of each other and being mutually separated in a width direction of the magnetic tape;
   first recording means for recording said luminance signal on one group of tracks out of said first through n-th groups of tracks by supplying said luminance signal to one pair of rotary heads for forming said one group of tracks, said one group of tracks being formed on a part of the magnetic tape closest to said part which is guided by said tape guide of said rotary body;
   second recording means for recording at least said two kinds of signals with a predetermined signal format on remaining n−1 groups of tracks excluding said one group of tracks by supplying at least said two kinds of signals to n−1 pairs of rotary heads for forming said remaining n−1 groups of tracks, said second recording means comprising synchronizing signal adding means for adding synchronizing signals having a constant period to one or both of said two kinds of signals, converting means for converting a signal format of the two kinds of signals at least one of which is added with the synchronizing signals into said predetermined signal format and supplying means for supplying an output signal of said converting means to said n−1 pairs of rotary heads;

a luminance signal reproducing circuit for reproducing a signal reproduced from said one group of tracks by said one pair of rotary heads into the original luminance signal;

reproducing circuit means for reproducing the two kinds of signals from the signals reproduced from said remaining n−1 groups of tracks by said remaining n−1 pairs of rotary heads;

synchronizing signal separating means for separating reproduced horizontal synchronizing signals and reproduced synchronizing signals from signals which are simultaneously reproduced by said first through n-th groups of tracks by said n pairs of rotary heads; and time compensation means for obtaining a phase error signal by comparing phases of the reproduced horizontal synchronizing signals and the reproduced synchronizing signals which are separated in said synchronizing signal separating means by taking the reproduced horizontal synchronizing signals as a reference and for matching timings of the reproduced signals from said first through n-th groups of tracks based on the phase error signal.

2. A magnetic recording and reproducing apparatus as claimed in claim 1 in which said time compensation means comprises charge transfer elements independently supplied with the two kinds of signals which are obtained by demodulating the signals reproduced by said n−1 pairs of rotary heads, phase comparator means for comparing the phases of the reproduced horizontal synchronizing signal and the reproduced synchronizing signals and variable frequency oscillator means variably controlled of an oscillation frequency of an output signal thereof responsive to an output error signal of said phase comparator means for variably controlling delay times of said charge transfer elements by supplying the output signal of said variable frequency oscillator to said charge transfer elements as a clock pulse.

3. A magnetic recording and reproducing apparatus as claimed in claim 1 in which said two kinds of signals are two kinds of color difference signals, said synchronizing signal adding means comprising a synchronizing signal generator for generating synchronizing signals having a period which is identical to that of the horizontal synchronizing signals and having a phase which is approximately the same as that of the horizontal synchronizing signals and means for adding the synchronizing signals from said synchronizing signal generating means to at least one of said two kinds of color difference signals.

4. A magnetic recording and reproducing apparatus as claimed in claim 1 in which each pair of said n pairs of rotary heads is constituted by two rotary heads which have gaps of mutually different azimuth angles, said n pairs of rotary heads being aligned in the axial direction of said rotary body.

5. A magnetic recording and reproducing apparatus as claimed in claim 1 in which n is equal to two, said second recording means comprising modulating means for independently frequency-modulating the two kinds of signals into two kinds of frequency modulated color difference signals having different frequency bands and mixing means for producing a frequency division multiplexed signal at least including said two kinds of frequency modulated color difference signals, said mixing means supplying the output frequency division multiplexed signal thereof to one of two pairs of rotary heads.

6. A magnetic recording and reproducing apparatus comprising:

a rotary body wrapped with a magnetic tape on an outer preipheral surface thereof over a predetermined angular range, said rotary body having a tape guide for guiding a part of the magnetic tape;

n pairs of rotary heads mounted on said rotary body, where n is an integer greater than or equal to two, each pair out of said n pairs of rotary heads being constituted by two rotary heads which are mounted at mutually opposite positions on a rotational plane of said rotary body at the same height position, each pair out of said n pairs of rotary heads being mounted at different positions in an axial direction of said rotary body, said n pairs of rotary heads recording a luminance signal and two kinds of signals constituting a color video signal on the magnetic tape by simultaneously forming first through n-th groups of tracks at the time of a recording and simultaneously reproducing the recorded signals from the first through the n-th groups of tracks at the time of a reproduction, said first through n-th groups of tracks being independent of each other and being mutually separated in a width direction of the magnetic tape;

first recording means for recording said luminance signal on one group of tracks out of said first through n-th groups of tracks by supplying said luminance signal to one pair of rotary heads for forming said one group of tracks, said one group of tracks being formed on a part of the magnetic tape closest to said part which is guided by said tape guide of said rotary body;

second recording means for recording at least said two kinds of signals with a predetermined signal format on remaining n−1 groups of tracks excluding said one group of tracks by supplying at least said two kinds of signals to n−1 pairs of rotary heads for forming said remaining n−1 groups of tracks;

a luminance signal reproducing circuit for reproducing a signal reproduced from said one group of tracks by said one pair of rotary heads into the original luminance signal;

reproducing circuit means for reproducing the two kinds of signals from the signals reproduced from said remaining n−1 groups of tracks by said remaining n−1 pairs of rotary heads;

n recording color video signal processing circuits for respectively separating a luminance signal and a carrier chrominance signal from a composite color video signal, frequency-converting the separated carrier chrominance signal into a frequency band lower than a frequency band of the frequency modulated luminance signal and generating a frequency division multiplexed signal in which the frequency modulated luminance signal and the frequency converted carrier chrominance signal are frequency-division-multiplexed;

first switching means for selectively supplying to said one pair of rotary heads the output frequency division multiplexed signal of one of said n recording color video signal processing circuits and/or said luminance signal from said first recording means;

second switching means for selectively supplying to the remaining n−1 rotary heads output signals of remaining n−1 recording color video signal processing circuits and/or the two kinds of signals from said second recording means;

n produced color video signal processing circuits for respectively reproducing the frequency division multiplexed signal into the original composite color video signal; and n third switching means for selectively and independently supplying the reproduced signals from said n pairs of rotary heads to said n reproduced color video signal processing circuits or said luminance signal reproducing circuit and said reproducing circuit means.

7. A magnetic recording and reproducing apparatus comprising:

a rotary body wrapped with a magnetic tape on an outer peripheral surface thereof over a predetermined angular range, said rotary body having a tape guide for guiding a part of the magnetic tape;

n pairs of rotary heads mounted on said rotary body, where n is an integer equal to three, each pair out of said n pairs of rotary heads being constituted by two rotary heads which are mounted at mutually opposite positions on a rotational plane of said rotary body at the same height position, each pair out of said n pairs of rotary heads being mounted at different positions in an axial direction of said rotary body, said n pairs of rotary heads recording a luminance signal and two kinds of signals constituting a color video signal on the magnetic tape by simultaneously forming first through n-th groups of tracks at the time of a recording and simultaneously reproducing the recorded signals from the first through the n-th groups of tracks at the time of a reproduction, said first through n-th groups of tracks being independent of each other and being mutually separated in a width direction of the magnetic tape;

first recording means for recording said luminance signal on one group of tracks out of said first through n-th groups of tracks by supplying said luminance signal to one pair of rotary heads for forming said one group of tracks, said one group of tracks being formed on a part of the magnetic tape closest to said part which is guided by said tape guide of said rotary body;

second recording means for recording at least said two kinds of signals with a predetermined signal format on remaining n−1 groups of tracks excluding said one group of tracks by supplying at least said two kinds of signals to n−1 pairs of rotary heads for forming said remaining n−1 groups of tracks, said second recording means comprising modulating means for independently frequency-modulating the two kinds of signals into first and second frequency modulated color difference signals and mixing means for producing a first frequency division multiplexed signal at least including said first frequency modulated color difference signal and a second frequency division multiplexed signal at least including said second frequency modulated color difference signal, said mixing means independently supplying the output first and second frequency division multiplexed signals thereof to two of three pairs of rotary heads;

a luminance signal reproducing circuit for reproducing a signal reproduced from said one group of tracks by said one pair of rotary heads into the original luminance signal; and reproducing circuit means for reproducing the two kinds of signals from the signals reproduced from said remaining n−1 groups of tracks by said remaining n−1 pairs of rotary heads.

* * * * *